United States Patent
Nozoe

(10) Patent No.: US 12,135,764 B2
(45) Date of Patent: Nov. 5, 2024

(54) EVALUATION DEVICE, EVALUATION METHOD, AND RECORDING MEDIUM

(71) Applicant: Panasonic Intellectual Property Management Co., Ltd., Osaka (JP)

(72) Inventor: Mitsushi Nozoe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 721 days.

(21) Appl. No.: 17/423,711

(22) PCT Filed: Dec. 25, 2019

(86) PCT No.: PCT/JP2019/050727
§ 371 (c)(1),
(2) Date: Jul. 16, 2021

(87) PCT Pub. No.: WO2020/158266
PCT Pub. Date: Aug. 6, 2020

(65) Prior Publication Data
US 2022/0083818 A1    Mar. 17, 2022

(30) Foreign Application Priority Data

Jan. 29, 2019   (JP) .................... 2019-013089

(51) Int. Cl.
*G06F 18/21* (2023.01)
*G06F 18/22* (2023.01)

(52) U.S. Cl.
CPC ............ *G06F 18/217* (2023.01); *G06F 18/22* (2023.01)

(58) Field of Classification Search
CPC .............................. G06F 18/217; G06F 18/22
See application file for complete search history.

(56) References Cited

U.S. PATENT DOCUMENTS

2019/0188238 A1* 6/2019 Oberoi .................. G06F 17/15

FOREIGN PATENT DOCUMENTS

JP    2005-267474    9/2005

OTHER PUBLICATIONS

International Search Report (ISR) issued on Mar. 24, 2020 in International (PCT) Application No. PCT/JP2019/050727.

* cited by examiner

*Primary Examiner* — Michael D. Yaary
(74) *Attorney, Agent, or Firm* — Wenderoth, Lind & Ponack, L.L.P.

(57) ABSTRACT

An evaluation device according to the present disclosure groups unit data in a unit data collection into two or more groups each including at least one of a plurality of data items, calculates, as a per-group unit space, a unit space in each of two or more per-group unit data collections which are unit data collections obtained by grouping the unit data into the two or more groups, calculates, using the per-group unit space calculated, a first Mahalanobis distance of a corresponding per-group unit data collection and a second Mahalanobis distance of a signal data collection in a corresponding data item, calculates a first linear combination of a plurality of first Mahalanobis distances calculated and a second linear combination of a plurality of second Mahalanobis distances calculated, compares the first and second linear combinations calculated, and outputs the comparison result as a first comparison result.

10 Claims, 22 Drawing Sheets

FIG. 3

| Item name | Data item 1 | Data item 2 | Data item 3 | Data item 4 | Data item 5 |
|---|---|---|---|---|---|
| Unit data 1 | $y_{11}$ | $y_{12}$ | $y_{13}$ | $y_{14}$ | $y_{15}$ |
| Unit data 2 | $y_{21}$ | $y_{22}$ | $y_{23}$ | $y_{24}$ | $y_{25}$ |
| Unit data 3 | $y_{31}$ | $y_{32}$ | $y_{33}$ | $y_{34}$ | $y_{35}$ |
| Unit data 4 | $y_{41}$ | $y_{42}$ | $y_{43}$ | $y_{44}$ | $y_{45}$ |
| Unit data 5 | $y_{51}$ | $y_{52}$ | $y_{53}$ | $y_{54}$ | $y_{55}$ |
| Signal data 1 | $x_{11}$ | $x_{12}$ | $x_{13}$ | $x_{14}$ | $x_{15}$ |
| Signal data 2 | $x_{21}$ | $x_{22}$ | $x_{23}$ | $x_{24}$ | $x_{25}$ |

FIG. 4

| Item name | Data item 1 | Data item 2 | Data item 3 | Data item 4 | Data item 5 |
|---|---|---|---|---|---|
| Unit data 1 | $y_{11}$ | $y_{12}$ | $y_{13}$ | $y_{14}$ | $y_{15}$ |
| Unit data 2 | $y_{21}$ | $y_{22}$ | $y_{23}$ | $y_{24}$ | $y_{25}$ |
| Unit data 3 | $y_{31}$ | $y_{32}$ | $y_{33}$ | $y_{34}$ | $y_{35}$ |
| Unit data 4 | $y_{41}$ | $y_{42}$ | $y_{43}$ | $y_{44}$ | $y_{45}$ |
| Unit data 5 | $y_{51}$ | $y_{52}$ | $y_{53}$ | $y_{54}$ | $y_{55}$ |

Group 1: Data item 1, Data item 2
Group 2: Data item 3, Data item 4, Data item 5

FIG. 5

| Item name | MD1 | MD2 |
|---|---|---|
| Unit data 1 | $MDr_{11}$ | $MDr_{21}$ |
| Unit data 2 | $MDr_{12}$ | $MDr_{22}$ |
| Unit data 3 | $MDr_{13}$ | $MDr_{23}$ |
| Unit data 4 | $MDr_{14}$ | $MDr_{24}$ |
| Unit data 5 | $MDr_{15}$ | $MDr_{25}$ |

FIG. 6

| Item name | MD1 | MD2 |
|---|---|---|
| Signal data 1 | $MDs_{11}$ | $MDs_{21}$ |
| Signal data 2 | $MDs_{12}$ | $MDs_{22}$ |

FIG. 9

| Item name | WAVE1 | WAVE2 | WAVE3 | WAVE4 | WAVE5 | WAVE6 | WAVE7 | WAVE8 | WAVE9 | WAVE10 | WAVE11 | WAVE12 |
|---|---|---|---|---|---|---|---|---|---|---|---|---|
| U1  | 0.52 | 0.54 | 0.54 | 0.51 | 0.5  | 0.49 | 0.47 | 0.46 | 0.48 | 0.48 | 0.46 | 0.57 |
| U2  | 0.5  | 0.48 | 0.48 | 0.48 | 0.49 | 0.48 | 0.48 | 0.49 | 0.47 | 0.5  | 0.49 | 0.59 |
| U3  | 0.49 | 0.46 | 0.46 | 0.46 | 0.46 | 0.44 | 0.45 | 0.45 | 0.46 | 0.52 | 0.5  | 0.63 |
| U4  | 0.53 | 0.51 | 0.52 | 0.49 | 0.5  | 0.51 | 0.49 | 0.51 | 0.48 | 0.54 | 0.48 | 0.58 |
| U5  | 0.6  | 0.56 | 0.56 | 0.53 | 0.53 | 0.53 | 0.53 | 0.52 | 0.5  | 0.51 | 0.48 | 0.53 |
| U6  | 0.51 | 0.47 | 0.5  | 0.47 | 0.47 | 0.48 | 0.48 | 0.49 | 0.47 | 0.51 | 0.47 | 0.57 |
| U7  | 0.47 | 0.46 | 0.49 | 0.49 | 0.5  | 0.5  | 0.5  | 0.51 | 0.5  | 0.54 | 0.51 | 0.63 |
| U8  | 0.53 | 0.5  | 0.51 | 0.53 | 0.55 | 0.54 | 0.52 | 0.54 | 0.54 | 0.55 | 0.54 | 0.62 |
| U9  | 0.49 | 0.47 | 0.5  | 0.49 | 0.47 | 0.45 | 0.46 | 0.45 | 0.47 | 0.49 | 0.49 | 0.59 |
| U10 | 0.5  | 0.47 | 0.49 | 0.47 | 0.48 | 0.46 | 0.47 | 0.47 | 0.47 | 0.5  | 0.5  | 0.59 |
| U11 | 0.48 | 0.49 | 0.49 | 0.5  | 0.52 | 0.51 | 0.52 | 0.5  | 0.54 | 0.55 | 0.55 | 0.63 |
| U12 | 0.53 | 0.52 | 0.53 | 0.52 | 0.45 | 0.53 | 0.46 | 0.47 | 0.48 | 0.57 | 0.5  | 0.62 |
| U13 | 0.49 | 0.45 | 0.46 | 0.44 | 0.45 | 0.45 | 0.5  | 0.5  | 0.52 | 0.5  | 0.53 | 0.58 |
| U14 | 0.49 | 0.48 | 0.5  | 0.49 | 0.51 | 0.51 | 0.51 | 0.55 | 0.52 | 0.54 | 0.52 | 0.6  |
| U15 | 0.55 | 0.53 | 0.53 | 0.52 | 0.52 | 0.53 | 0.51 | 0.49 | 0.52 | 0.57 | 0.47 | 0.64 |
| U16 | 0.46 | 0.45 | 0.46 | 0.44 | 0.46 | 0.46 | 0.46 | 0.5  | 0.46 | 0.51 | 0.52 | 0.6  |
| U17 | 0.53 | 0.53 | 0.54 | 0.52 | 0.53 | 0.51 | 0.51 | 0.51 | 0.51 | 0.53 | 0.47 | 0.58 |
| U18 | 0.47 | 0.45 | 0.47 | 0.45 | 0.45 | 0.46 | 0.46 | 0.46 | 0.46 | 0.49 | 0.52 | 0.56 |
| U19 | 0.54 | 0.53 | 0.52 | 0.52 | 0.5  | 0.5  | 0.49 | 0.51 | 0.49 | 0.54 | 0.5  | 0.6  |
| U20 | 0.52 | 0.52 | 0.51 | 0.52 | 0.52 | 0.51 | 0.5  | 0.5  | 0.49 | 0.52 | 0.52 | 0.6  |
| U21 | 0.56 | 0.54 | 0.54 | 0.53 | 0.52 | 0.54 | 0.5  | 0.5  | 0.5  | 0.56 | 0.49 | 0.6  |
| U22 | 0.52 | 0.52 | 0.52 | 0.51 | 0.49 | 0.48 | 0.47 | 0.48 | 0.45 | 0.47 | 0.45 | 0.53 |
| U23 | 0.51 | 0.49 | 0.5  | 0.49 | 0.5  | 0.47 | 0.46 | 0.48 | 0.5  | 0.52 | 0.52 | 0.59 |
| U24 | 0.55 | 0.53 | 0.54 | 0.52 | 0.51 | 0.5  | 0.47 | 0.51 | 0.49 | 0.55 | 0.51 | 0.6  |
| U25 | 0.48 | 0.45 | 0.47 | 0.46 | 0.46 | 0.44 | 0.43 | 0.44 | 0.46 | 0.5  | 0.47 | 0.58 |
| U26 | 0.53 | 0.51 | 0.53 | 0.51 | 0.51 | 0.51 | 0.49 | 0.51 | 0.49 | 0.52 | 0.48 | 0.56 |
| S1  | 0.43 | 0.41 | 0.43 | 0.41 | 0.41 | 0.41 | 0.39 | 0.41 | 0.39 | 0.42 | 0.38 | 0.47 |
| S2  | 0.53 | 0.51 | 0.53 | 0.51 | 0.51 | 0.51 | 0.63 | 0.51 | 0.49 | 0.52 | 0.46 | 0.57 |
| S3  | 0.63 | 0.61 | 0.63 | 0.51 | 0.51 | 0.51 | 0.49 | 0.51 | 0.49 | 0.52 | 0.46 | 0.57 |
| S4  | 0.55 | 0.53 | 0.54 | 0.52 | 0.51 | 0.5  | 0.47 | 0.51 | 0.49 | 0.55 | 0.54 | 0.53 |

U1–U26: Unit data collection

S1–S4: Signal data collection

FIG. 11A

| | WAVE1 | WAVE2 | WAVE3 | ⋯ | WAVE11 | WAVE12 | MD value in MT system | MD1_1 | MD1_2 | MD1_3 | MD value in multi-MT system | MD value in present system |
|---|---|---|---|---|---|---|---|---|---|---|---|---|
| U1 | 0.58 | 0.54 | 0.54 | | 0.48 | 0.57 | 1.862772 | 1.394201 | 0.844343 | 1.351913 | 0.333459 | 1.196819 |
| U2 | 0.5 | 0.48 | 0.48 | | 0.49 | 0.59 | 0.888631 | 0.747444 | 0.135249 | 0.371862 | 0.322292 | 0.418185 |
| U3 | 0.49 | 0.46 | 0.46 | | 0.5 | 0.63 | 1.153662 | 1.718811 | 0.84484 | 1.653006 | 1.00789 | 1.405552 |
| U4 | 0.53 | 0.51 | 0.52 | | 0.48 | 0.58 | 0.813612 | 0.853071 | 0.359788 | 1.003355 | 0.389398 | 0.738739 |
| U5 | 0.6 | 0.56 | 0.56 | | 0.48 | 0.53 | 1.236722 | 1.792961 | 1.675793 | 2.023476 | 1.659838 | 1.830744 |
| U6 | 0.51 | 0.47 | 0.5 | | 0.47 | 0.57 | 0.917393 | 1.126065 | 0.742085 | 0.347747 | 0.828408 | 0.738632 |
| U7 | 0.47 | 0.46 | 0.49 | | 0.51 | 0.63 | 0.711586 | 1.306818 | 0.384332 | 0.91089 | 0.409071 | 0.86728 |
| U8 | 0.53 | 0.5 | 0.53 | | 0.54 | 0.62 | 1.36152 | 2.764304 | 1.204784 | 1.624422 | 2.779706 | 1.864503 |
| U9 | 0.49 | 0.47 | 0.5 | | 0.49 | 0.59 | 1.220251 | 0.799096 | 0.947804 | 0.74734 | 0.106259 | 0.831413 |
| U10 | 0.5 | 0.49 | 0.49 | | 0.5 | 0.59 | 0.631919 | 0.342829 | 1.423658 | 0.660868 | 0.723788 | 0.809118 |
| U11 | 0.48 | 0.49 | 0.49 | | 0.5 | 0.63 | 1.367244 | 1.453986 | 3.039593 | 1.588166 | 3.183324 | 2.027242 |
| U12 | 0.53 | 0.52 | 0.53 | | 0.55 | 0.63 | 1.018654 | 0.309119 | 0.953826 | 1.278372 | 0.845793 | 0.847106 |
| U13 | 0.49 | 0.45 | 0.46 | | 0.5 | 0.58 | 1.109074 | 1.481691 | 1.05352 | 0.531061 | 0.919957 | 1.022091 |
| U14 | 0.49 | 0.48 | 0.53 | | 0.53 | 0.6 | 0.88173 | 0.391923 | 0.608385 | 0.629837 | 0.431631 | 0.543382 |
| U15 | 0.55 | 0.53 | 0.46 | | 0.52 | 0.64 | 0.846008 | 0.357852 | 1.629262 | 1.606907 | 1.49306 | 1.197941 |
| U16 | 0.46 | 0.45 | 0.46 | | 0.47 | 0.6 | 1.078539 | 1.814119 | 1.410404 | 0.855955 | 1.004236 | 1.37016 |
| U17 | 0.53 | 0.53 | 0.54 | | 0.52 | 0.58 | 1.010402 | 1.445459 | 1.118003 | 0.859135 | 0.33455 | 1.140866 |
| U18 | 0.47 | 0.45 | 0.47 | | 0.45 | 0.56 | 0.798243 | 0.832264 | 1.108072 | 1.234567 | 0.160818 | 1.058301 |
| U19 | 0.54 | 0.53 | 0.52 | | 0.5 | 0.6 | 0.685068 | 0.877747 | 0.137718 | 0.222943 | 1.125808 | 0.412771 |
| U20 | 0.52 | 0.52 | 0.51 | | 0.52 | 0.6 | 0.814221 | 1.36184 | 0.534228 | 0.932889 | 0.3200049 | 0.943767 |
| U21 | 0.56 | 0.54 | 0.54 | | 0.49 | 0.6 | 1.009746 | 0.537413 | 0.294983 | 1.384109 | 1.395344 | 0.738835 |
| U22 | 0.52 | 0.52 | 0.52 | | 0.45 | 0.53 | 1.113332 | 0.751562 | 0.198359 | 1.352674 | 1.237406 | 0.767532 |
| U23 | 0.51 | 0.49 | 0.5 | | 0.52 | 0.59 | 0.888907 | 0.028197 | 1.744492 | 0.693735 | 1.516147 | 0.822141 |
| U24 | 0.55 | 0.53 | 0.53 | | 0.51 | 0.6 | 1.368548 | 0.389592 | 1.818505 | 1.219601 | 0.998257 | 1.142566 |
| U25 | 0.48 | 0.45 | 0.47 | | 0.47 | 0.57 | 1.113046 | 0.664348 | 1.575122 | 0.394425 | 1.242835 | 0.877965 |
| U26 | 0.53 | 0.51 | 0.53 | | 0.48 | 0.57 | 0.321173 | 0.455364 | 0.212849 | 0.490842 | 0.720877 | 0.386351 |
| S1 | 0.43 | 0.41 | 0.43 | | 0.38 | 0.47 | 4.785814 | 2.566122 | 5.049689 | 6.44994 | 45.98027 | 4.688577 |
| S2 | 0.53 | 0.51 | 0.53 | | 0.48 | 0.57 | 22.34399 | 0.455364 | 47.62545 | 0.490842 | 1929.985 | 16.19055 |
| S3 | 0.63 | 0.61 | 0.63 | | 0.48 | 0.57 | 18.65622 | 31.90259 | 0.212849 | 0.490842 | 989.3196 | 10.86878 |
| S4 | 0.55 | 0.53 | 0.54 | | 0.54 | 0.53 | 13.17609 | 0.389592 | 1.818505 | 23.20655 | 963.599 | 8.471548 |

Unit data collection: U1–U26
Signal data collection: S1–S4

FIG. 11B

| Item name | MD value in MT system | MD value in multi-MT system | MD value in present system |
|---|---|---|---|
| U1 | 1.862772 | 0.333459 | 1.196819 |
| U2 | 0.666631 | 0.832292 | 0.418185 |
| U3 | 1.153662 | 1.00789 | 1.405552 |
| U4 | 0.813612 | 0.389398 | 0.738738 |
| U5 | 1.236722 | 1.659838 | 1.830744 |
| U6 | 0.917393 | 0.828408 | 0.738632 |
| U7 | 0.711586 | 0.409071 | 0.86728 |
| U8 | 1.36152 | 2.779706 | 1.864503 |
| U9 | 1.220251 | 0.106259 | 0.831413 |
| U10 | 0.631919 | 0.723788 | 0.809118 |
| U11 | 1.367244 | 3.183324 | 2.027242 |
| U12 | 1.018654 | 0.845793 | 0.847106 |
| U13 | 1.109074 | 0.919957 | 1.022091 |
| U14 | 0.88173 | 0.431631 | 0.543382 |
| U15 | 0.846008 | 1.49306 | 1.197941 |
| U16 | 1.078539 | 1.004236 | 1.37016 |
| U17 | 1.010402 | 0.33455 | 1.140866 |
| U18 | 0.798243 | 0.160818 | 1.058301 |
| U19 | 0.685068 | 1.125608 | 0.412771 |
| U20 | 0.814221 | 0.320049 | 0.943767 |
| U21 | 1.009746 | 1.395344 | 0.738835 |
| U22 | 1.113332 | 1.237406 | 0.767532 |
| U23 | 0.888807 | 1.516147 | 0.822141 |
| U24 | 1.368548 | 0.998257 | 1.142566 |
| U25 | 1.113046 | 1.242835 | 0.877965 |
| U26 | 0.321173 | 0.720877 | 0.386351 |
| S1 | 4.785814 | 45.98027 | 4.688577 |
| S2 | 22.34399 | 1929.985 | 16.19055 |
| S3 | 18.65622 | 989.3196 | 10.86876 |
| S4 | 13.17609 | 963.599 | 8.471548 |

FIG. 13A

| MD value in MT system | Item number | Item name | 1 WAVE1 | 2 WAVE2 | 3 WAVE3 | 4 WAVE4 | 5 WAVE5 | 6 WAVE6 | 7 WAVE7 | 8 WAVE8 | 9 WAVE9 | 10 WAVE10 | 11 WAVE11 | 12 WAVE12 |
|---|---|---|---|---|---|---|---|---|---|---|---|---|---|---|
| 4.785814 | | S1 | -0.9863 | -0.35084 | 0.021356 | -0.44315 | -0.28706 | 0.613243 | -0.01819 | -0.71073 | -0.69889 | -0.63674 | -0.14302 | 1.123147 |
| 22.34399 | | S2 | -1.67513 | -0.21103 | 0.119141 | -0.52921 | -0.03701 | 0.530239 | 18.66771 | -0.11644 | -0.29312 | -0.61423 | -0.40173 | -0.34481 |
| 18.65622 | | S3 | 1.492365 | 2.58236 | 6.791107 | 2.578377 | 0.891523 | -0.05811 | 0.161583 | -0.91628 | -1.75347 | -3.5118 | -1.76207 | -0.45776 |
| 13.17609 | | S4 | -1.358825 | -1.04622 | 0.320723 | 0.629777 | -1.18143 | -1.10956 | 0.758845 | -0.08756 | -0.23825 | 1.913182 | 5.12194 | 5.175464 |

FIG. 13B

| MD value in multi-MT system | Item number | 1 | 2 | 3 |
|---|---|---|---|---|
| | Item name | MD1_1 | MD1_2 | MD1_3 |
| 45.98027 | S1 | -6.05889 | 1.500365 | 6.999283 |
| 1929.985 | S2 | -2.84782 | 35.10989 | -1.20604 |
| 989.3196 | S3 | 30.96563 | -1.60573 | -2.47036 |
| 963.599 | S4 | -2.70123 | -0.84583 | 30.74283 |

FIG. 13C

| Item name | MD1_1 | MD1_2 | MD1_3 |
|---|---|---|---|
| S1 | 2.566122 | 5.049669 | 6.44994 |
| S2 | 0.455364 | 47.62545 | 0.490842 |
| S3 | 31.90259 | 0.212849 | 0.490842 |
| S4 | 0.389592 | 1.818505 | 23.20655 |

FIG. 18

(Correlation coefficient)

| Item name | WAVE1 | WAVE2 | WAVE3 | WAVE4 | WAVE5 | WAVE6 | WAVE7 | WAVE8 | WAVE9 | WAVE10 | WAVE11 | WAVE12 |
|---|---|---|---|---|---|---|---|---|---|---|---|---|
| WAVE1 | 1 | | | | | | | | | | | |
| WAVE2 | 0.922252 | 1 | | | | | | | | | | |
| WAVE3 | 0.896364 | 0.935775 | 1 | | | | | | | | | |
| WAVE4 | 0.772298 | 0.901614 | 0.916117 | 1 | | | | | | | | |
| WAVE5 | 0.686715 | 0.781856 | 0.841924 | 0.893529 | 1 | | | | | | | |
| WAVE6 | 0.618789 | 0.744593 | 0.787793 | 0.837511 | 0.89124 | 1 | | | | | | |
| WAVE7 | 0.561461 | 0.634685 | 0.703116 | 0.720162 | 0.867858 | 0.895188 | 1 | | | | | |
| WAVE8 | 0.512696 | 0.614932 | 0.652449 | 0.686601 | 0.785138 | 0.929843 | 0.854373 | 1 | | | | |
| WAVE9 | 0.408723 | 0.438427 | 0.557144 | 0.606613 | 0.805863 | 0.748506 | 0.795371 | 0.746974 | 1 | | | |
| WAVE10 | 0.212763 | 0.339217 | 0.35827 | 0.489928 | 0.558661 | 0.690137 | 0.563622 | 0.754957 | 0.709658 | 1 | | |
| WAVE11 | 0.124957 | 0.211215 | 0.247519 | 0.424075 | 0.597815 | 0.493035 | 0.524129 | 0.485102 | 0.842887 | 0.696019 | 1 | |
| WAVE12 | -0.2432 | -0.13574 | -0.15874 | 0.084534 | 0.162662 | 0.222397 | 0.159231 | 0.335643 | 0.433841 | 0.724141 | 0.696415 | 1 |

FIG. 19

| Pair | Correlation coefficient |
|---|---|
| 1-2 | 0.922252 |
| 1-3 | 0.896364 |
| 1-4 | 0.772298 |
| 1-5 | 0.686715 |
| 1-6 | 0.618789 |
| 1-7 | 0.561461 |
| 1-8 | 0.512696 |
| 1-9 | 0.408723 |
| 1-10 | 0.212763 |
| 1-11 | 0.124957 |
| 1-12 | -0.2432 |
| 2-3 | 0.935775 |
| 2-4 | 0.901614 |
| 2-5 | 0.781856 |
| 2-6 | 0.744593 |
| 2-7 | 0.634685 |
| 2-8 | 0.614932 |
| 2-9 | 0.438427 |
| 2-10 | 0.339217 |
| 2-11 | 0.211215 |
| 2-12 | -0.13574 |
| 3-4 | 0.916117 |
| 3-5 | 0.841924 |
| 3-6 | 0.787793 |
| 3-7 | 0.703116 |
| 3-8 | 0.652449 |
| 3-9 | 0.557144 |
| 3-10 | 0.35827 |
| 3-11 | 0.247519 |
| 3-12 | -0.15874 |
| 4-5 | 0.893529 |
| 4-6 | 0.837511 |
| 4-7 | 0.720162 |
| 4-6 | 0.686601 |
| 4-9 | 0.606613 |
| 4-10 | 0.489928 |
| 4-11 | 0.424075 |
| 4-12 | 0.084534 |
| 5-6 | 0.89124 |
| 5-7 | 0.867858 |
| 5-8 | 0.785138 |
| 5-9 | 0.805863 |
| 5-10 | 0.558661 |
| 5-11 | 0.597815 |
| 5-12 | 0.162662 |
| 6-7 | 0.895188 |
| 6-8 | 0.929843 |
| 6-9 | 0.748506 |
| 6-10 | 0.690137 |
| 6-11 | 0.493035 |
| 6-12 | 0.222397 |
| 7-8 | 0.854373 |
| 7-9 | 0.795371 |
| 7-10 | 0.563622 |
| 7-11 | 0.524129 |
| 7-12 | 0.159231 |
| 8-9 | 0.746974 |
| 8-10 | 0.754957 |
| 8-11 | 0.485102 |
| 8-12 | 0.335643 |
| 9-10 | 0.709658 |
| 9-11 | 0.842887 |
| 9-12 | 0.433841 |
| 10-11 | 0.696019 |
| 10-12 | 0.724141 |
| 11-12 | 0.696415 |

FIG. 20

| Pair | Correlation coefficient | Group 1 | Group 2 | |
|---|---|---|---|---|
| 2-3 | 0.935775 | 2-3 | | |
| 6-8 | 0.929843 | | 6-8 | |
| 1-2 | 0.922252 | 1-2-3 | | |
| 3-4 | 0.916117 | 1-2-3-4 | | Group 1 completed |
| 2-4 | 0.901614 | | | |
| 1-3 | 0.896364 | | | |
| 6-7 | 0.895188 | | 6-7-8 | |
| 4-5 | 0.893529 | | | |
| 5-6 | 0.89124 | | 5-6-7-8 | Group 2 completed |
| 5-7 | 0.867858 | | | |
| 7-8 | 0.854373 | | | |
| 9-11 | 0.842887 | | | |
| 3-5 | 0.841924 | | | |
| 4-6 | 0.837511 | | | |
| 5-9 | 0.805863 | | | |
| 7-9 | 0.795371 | | | |
| 3-6 | 0.787793 | | | |
| 5-8 | 0.785138 | | | |
| 2-5 | 0.781856 | | | |
| 1-4 | 0.772298 | | | |
| 8-10 | 0.754957 | | | |
| 6-9 | 0.748506 | | | |
| 8-9 | 0.746974 | | | |
| 2-6 | 0.744593 | | | |
| 10-11 | 0.724141 | | | |
| 6-12 | 0.222397 | | | |
| 1-10 | 0.212763 | | | |
| 2-11 | 0.211215 | | | |
| 5-12 | 0.162662 | | | |
| 7-12 | 0.159231 | | | |
| 1-11 | 0.124957 | | | |
| 4-12 | 0.084534 | | | |
| 2-12 | -0.13574 | | | |
| 3-12 | -0.15874 | | | |
| 1-12 | -0.2432 | | | |

EVALUATION DEVICE, EVALUATION METHOD, AND RECORDING MEDIUM

TECHNICAL FIELD

The present disclosure relates to evaluation devices, evaluation methods, and recording media, and particularly relate to an evaluation device, an evaluation method, and a recording medium in which the Mahalanobis distance is used.

BACKGROUND ART

An abnormality cause diagnosis method for pattern recognition in which the Mahalanobis distance is used has been proposed (for example, Patent Literature (PTL) 1). In the invention disclosed in PTL 1, the Mahalanobis distance is obtained, then the absolute value of the product of a distance element value of the $i^{-th}$ element and a correlation coefficient for another element is calculated, and the maximum value for each element is extracted from the calculation results.

CITATION LIST

Patent Literature

[PTL 1] Japanese Unexamined Patent Application Publication No. 2005-267474

SUMMARY OF INVENTION

Technical Problem

With the technique disclosed in PTL 1, however, inverse matrix calculation or the like corresponding to the number of features that are used as data items is required to calculate the Mahalanobis distance, leading to the problem of requiring calculation time. Therefore, performing the abnormality cause diagnosis in which the Mahalanobis distance is used also requires calculation time.

The present disclosure is conceived in view of the above-described circumstances and has as an object to provide an evaluation device, etc., capable of shortening the calculation time by reducing the amount of calculation for the Mahalanobis distance.

Solution to Problem

In order to solve the aforementioned problem, an evaluation device according to one aspect of the present disclosure is an evaluation device for evaluating a signal data collection from a data set using a Mahalanobis distance, the data set including a unit data collection and the signal data collection, the unit data collection being a collection of data to be used as a reference for a plurality of data items, the signal data collection being one or more pieces of data to be evaluated for the plurality of data items, the evaluation device including: a processor; and a memory. The processor performs the following using the memory: grouping unit data in the unit data collection into two or more groups each including at least one of the plurality of data items; calculating a unit space in each of two or more per-group unit data collections as a per-group unit space, the two or more per-group unit data collections being unit data collections obtained by grouping the unit data into the two or more groups; calculating, using the per-group unit space calculated, a first Mahalanobis distance of a corresponding one of the two or more per-group unit data collections; calculating, using each per-group unit space calculated, a second Mahalanobis distance of the signal data collection in a corresponding one of the plurality of data items; calculating a first linear combination of a plurality of the first Mahalanobis distances calculated; calculating a second linear combination of a plurality of the second Mahalanobis distances calculated; and comparing the first linear combination calculated and the second linear combination calculated, and outputting a result of the comparing as a first comparison result.

Note that the aforementioned general or specific aspects may be implemented using a device, a method, a system, an integrated circuit, a computer program, or a computer-readable recording medium such as a compact disc read-only memory (CD-ROM), or any combination of devices, methods, systems, integrated circuits, computer programs, and recording media.

Advantageous Effects of Invention

With the evaluation device, etc., according to the present disclosure, it is possible to shorten the calculation time by reducing the amount of calculation for the Mahalanobis distance.

BRIEF DESCRIPTION OF DRAWINGS

FIG. 3 is a diagram illustrating one example of a unit data collection and a signal data collection according to an embodiment.

FIG. 4 is a diagram illustrating an example where unit data in the unit data collection illustrated in FIG. 3 are grouped into two groups.

FIG. 5 is a diagram illustrating one example of the Mahalanobis distance of a unit data collection using a per-group unit space according to an embodiment.

FIG. 6 is a diagram illustrating one example of the Mahalanobis distance of a signal data collection using a per-group unit space according to an embodiment.

FIG. 9 is a diagram illustrating one example of waveform data according to Example 1.

FIG. 11A is a diagram illustrating MD values in the MT system and MD values in the present system for the waveform data illustrated in FIG. 9.

FIG. 11B is a diagram illustrating MD values in the MT system, MD values in the present system, and MD values in the multi-MT system, extracted from FIG. 11A.

FIG. 13A is a diagram illustrating the result of calculation for item diagnosis using the MT system for data items of the signal data collection illustrated in FIG. 11A.

FIG. 13B is a diagram illustrating the result of calculation for item diagnosis using the multi-MT system for per-group MD values of the signal data collection illustrated in FIG. 11A.

FIG. 13C is a table used for item diagnosis using the present system for data items of the signal data collection illustrated in FIG. 11A.

FIG. 18 is a diagram illustrating one example of a correlation coefficient table according to Example 2.

FIG. 19 is a table of the correlation coefficients indicated in FIG. 18, listed for each pair of data items.

FIG. 20 is a diagram showing correlation coefficients obtained by sorting, in descending order, the correlation coefficients indicated in FIG. 19, pairs of data items corresponding to the correlation coefficients, and the process of grouping the data items into three groups.

DESCRIPTION OF EMBODIMENTS

Figure 1:
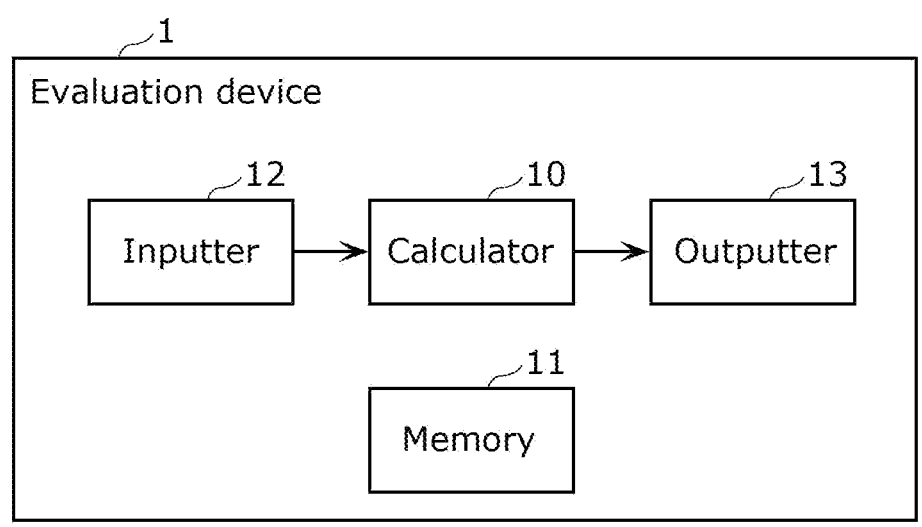
FIG. 1 is a block diagram illustrating one example of an evaluation device according to an embodiment.

Underlying Knowledge Forming Basis of the Present Disclosure

The Mahalanobis-Taguchi (MT) system is known as a method in which normality or abnormality can be determined on the basis of the Mahalanobis distance. In the MT system, normal homogeneous data is prepared as a unit space that is a collection of data regarded as a reference, and deviation from the pattern of such data is converted into numerical values as the Mahalanobis distance. Subsequently, the Mahalanobis distance of subject data is calculated, and whether the subject data is normal or abnormal is determined according to the level of difference between the subject data and the unit space.

The Mahalanobis distance is a multi-dimensional distance into which correlation is also taken into consideration; inverse matrix calculation or the like corresponding to the number of features that are used as data items of a collection of data in the unit space is required to calculate the Mahalanobis distance. Therefore, it is problematic that calculation time is needed to calculate the Mahalanobis distance. Note that the amount of calculation increases with an increase in the number of data items.

Thus, the present disclosure has as an object to provide an evaluation device, etc., capable of shortening the calculation time by reducing the amount of calculation for the Mahalanobis distance.

Specifically, an evaluation device according to one aspect of the present disclosure is an evaluation device for evaluating a signal data collection from a data set using a Mahalanobis distance, the data set including a unit data collection and the signal data collection, the unit data collection being a collection of data to be used as a reference for a plurality of data items, the signal data collection being one or more pieces of data to be evaluated for the plurality of data items, the evaluation device including: a processor; and a memory. The processor performs the following using the memory: grouping unit data in the unit data collection into two or more groups each including at least one of the plurality of data items; calculating a unit space in each of two or more per-group unit data collections as a per-group unit space, the two or more per-group unit data collections being unit data collections obtained by grouping the unit data into the two or more groups; calculating, using the per-group unit space calculated, a first Mahalanobis distance of a corresponding one of the two or more per-group unit data collections; calculating, using each per-group unit space calculated, a second Mahalanobis distance of the signal data collection in a corresponding one of the plurality of data items; calculating a first linear combination of a plurality of the first Mahalanobis distances calculated; calculating a second linear combination of a plurality of the second Mahalanobis distances calculated; and comparing the first linear combination calculated and the second linear combination calculated, and outputting a result of the comparing as a first comparison result.

With this configuration, the plurality of data items of the unit data collection are grouped, thus the unit data collection is divided into two or more groups, the Mahalanobis distance of the signal data collection is calculated for each group, a linear combination of the Mahalanobis distances calculated is obtained, and the signal data collection is evaluated using the obtained linear combination. Thus, it is possible to reduce the amount of calculation for the Mahalanobis distance such as inverse matrix calculation, and therefore the calculation time can be shortened.

Furthermore, for example, the grouping of the unit data in the unit data collection into the two or more groups may include: obtaining a correlation coefficient indicating a relationship between every pair of data items among the plurality of data items of the unit data collection; sorting, in descending order, a plurality of the correlation coefficients obtained; determining an upper limit of a total number of data items included in each of the two or more groups; and classifying each pair of data items indicating the correlation coefficients in the descending order, as one of the two or more groups according to the upper limit of the total number determined, to group the unit data in the unit data collection into the two or more groups.

Here, for example, the classifying may include, when at least one of the pair of data items indicating the correlation coefficient overlaps a data item included in a previous classification group and a total number of data items included in the previous classification group is smaller than the upper limit of the total number determined, classifying the pair of data items indicating the correlation coefficient as the previous classification group.

Furthermore, for example, the grouping of the unit data in the unit data collection into the two or more groups may include: for every pair of data items among the plurality of data items, obtaining a correlation coefficient indicating a relationship between a selected pair of data items among the plurality of data items, and when the correlation coefficient obtained is greater than or equal to a threshold value, classifying the selected pair of data items as one of the two or more groups; and when the obtaining of the correlation coefficient and the classifying of the selected pair of data items are performed for every pair, classifying one or more data items that have not been classified as one of the two or more groups, as one of the two or more groups that has not been used during the repetitive classification for every pair, to group the unit data in the unit data collection into the two or more groups.

Furthermore, for example, the grouping of the unit data in the unit data collection into the two or more groups may include: determining a total number of groups in the two or more groups; and allocating the plurality of data items of the unit data collection to the groups whose total number has been determined, to group the unit data in the unit data collection into the two or more groups.

Furthermore, for example, the grouping of the unit data in the unit data collection into the two or more groups may include: determining a total number of data items included in each of the two or more groups; and grouping the plurality of data items of the unit data collection for each of the data items whose total number has been determined, to group the unit data in the unit data collection into the two or more groups.

Furthermore, for example, each coefficient in linear form to be used to calculate the first linear combination and the second linear combination may be a unit fraction where a denominator is a total number of groups in the two or more groups.

Furthermore, for example, the processor may further perform the following using the memory: comparing, for each signal data collection, the plurality of the second Mahalanobis distances calculated, and outputting a result of the comparing as a second comparison result; and performing an item diagnosis for analyzing, based on the second comparison result, which of the plurality of data items has become abnormal.

Furthermore, an evaluation method according to one aspect of the present disclosure is an evaluation method for a computer to evaluate a signal data collection from a data set using a Mahalanobis distance, the data set including a unit data collection and the signal data collection, the unit data collection being a collection of data to be used as a reference for a plurality of data items, the signal data collection being one or more pieces of data to be evaluated for the plurality of data items, the evaluation method including: grouping unit data in the unit data collection into two or more groups each including at least one of the plurality of data items; calculating a unit space in each of two or more per-group unit data collections as a per-group unit space, the two or more per-group unit data collections being unit data collections obtained by grouping the unit data into the two or more groups; calculating, using the per-group unit space calculated, a first Mahalanobis distance of a corresponding one of the two or more per-group unit data collections; calculating, using each per-group unit space calculated, a second Mahalanobis distance of the signal data collection in a corresponding one of the plurality of data items; calculating a first linear combination of a plurality of the first Mahalanobis distances calculated; calculating a second linear combination of a plurality of the second Mahalanobis distances calculated; and comparing the first linear combination calculated and the second linear combination calculated, and outputting a comparison result.

Furthermore, a non-transitory computer-readable recording medium having a program recorded thereon according to one aspect of the present disclosure causes a computer to perform an evaluation method for evaluating a signal data collection from a data set using a Mahalanobis distance, the data set including a unit data collection and the signal data collection, the unit data collection being a collection of data to be used as a reference for a plurality of data items, the signal data collection being one or more pieces of data to be evaluated for the plurality of data items, the evaluation method including: grouping unit data in the unit data collection into two or more groups each including at least one of the plurality of data items; calculating a unit space in each of two or more per-group unit data collections as a per-group unit space, the two or more per-group unit data collections being unit data collections obtained by grouping the unit data into the two or more groups; calculating, using the per-group unit space calculated, a first Mahalanobis distance of a corresponding one of the two or more per-group unit data collections; calculating, using each per-group unit space calculated, a second Mahalanobis distance of the signal data collection in a corresponding one of the plurality of data items; calculating a first linear combination of a plurality of the first Mahalanobis distances calculated; calculating a second linear combination of a plurality of the second Mahalanobis distances calculated; and comparing the first linear combination calculated and the second linear combination calculated, and outputting a comparison result.

Each of the embodiments described below shows a specific example of the present disclosure. The numerical values, shapes, structural elements, steps, the processing order of the steps etc., shown in the following embodiments are mere examples, and are not intended to limit the present disclosure. Among the structural elements in the following embodiments, structural elements not recited in any one of the independent claims which indicate the broadest concepts will be described as arbitrary structural elements. In every embodiment, various features can be combined.

EMBODIMENT

Hereinafter, with reference to the drawings, an evaluation device, etc., according to an embodiment will be described.

[Evaluation Device 1]

FIG. 1 is a block diagram illustrating one example of evaluation device 1 according to the present embodiment.

Evaluation device 1 is used to evaluate, using the Mahalanobis distance, a signal data collection from a data set including a unit data collection, which is a collection of data to be used as a reference for a plurality of data items, and the signal data collection, which is one or more collections of data to be evaluated for the plurality of data items.

Evaluation device 1 is a computer including a processor (microprocessor) such as a central processing unit (CPU), a memory, and the like. More specifically, evaluation device 1 includes calculator 10, memory 11, inputter 12, and outputter 13, as illustrated in FIG. 1, for example. Note that evaluation device 1 need not include inputter 12 or outputter 13.

[Inputter 12]

Inputter 12 receives a data set including a unit data collection, which is a collection of data to be used as a reference for a plurality of data items, and a signal data collection, which is one or more collections of data to be evaluated for the plurality of data items. The unit data collection and the signal data collection may be separately input to inputter 12.

[Memory 11]

Memory 11, which is one example of the storage medium, is configured from a rewritable, non-volatile memory such as a hard disk drive or a solid-state drive, for example. In the present embodiment, memory 11 stores the data set input to inputter 12.

Furthermore, memory 11 may store a program of a method for calculating the Mahalanobis distance, mathematical expressions used to calculate the Mahalanobis distance, the calculated correlation coefficients, the calculation results, etc., in the present embodiment to be described later.

[Calculator 10]

Figure 2:
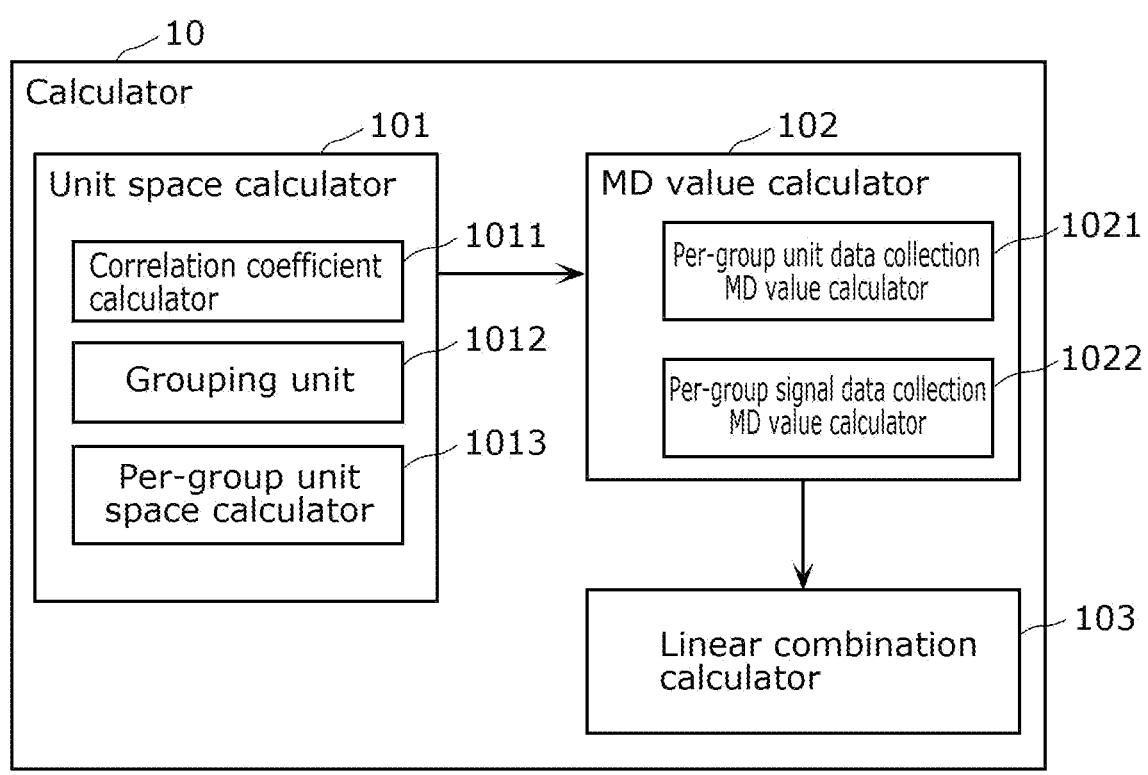
FIG. 2 is a block diagram illustrating one example of specific functional elements of a calculator illustrated in FIG. 1.

FIG. 2 is a block diagram illustrating one example of specific functional elements of calculator 10 illustrated in FIG. 1.

Calculator 10 is, for example, a processor (microprocessor) such as a CPU and performs calculation using the Mahalanobis distance by way of memory 11 and the like in order to evaluate the signal data collection. In the present embodiment, calculator 10 includes unit space calculator 101, MD value calculator 102, and linear combination calculator 103, as illustrated in FIG. 2.

<Unit Space Calculator 101>

FIG. 3 is a diagram illustrating one example of the unit data collection and the signal data collection according to the embodiment. FIG. 4 is a diagram illustrating an example where unit data in the unit data collection illustrated in FIG. 3 are grouped into two groups.

Unit space calculator 101 groups unit data in the unit data collection into two or more groups each including at least one of the plurality of data items, and calculates, as a per-group unit space, a unit space in each of two or more per-group unit data collections which are unit data collections obtained by grouping the unit data into the two or more groups. In the present embodiment, unit space calculator 101 includes correlation coefficient calculator 1011, grouping unit 1012, and per-group unit space calculator 1013, as illustrated in FIG. 2.

«Correlation Coefficient Calculator 1011»

Correlation coefficient calculator 1011 calculates a correlation coefficient indicating the relationship between every pair of data items among the plurality of data items of the unit data collection. This will be described using the example illustrated in FIG. 3. Correlation coefficient calculator 1011 calculates correlation coefficients of the unit data in data items 1 and 2, data items 1 and 3, data items 1 and 4, data items 1 and 5, data items 2 and 3, data items 2 and 4, data items 2 and 5, data items 3 and 4, data items 3 and 5, and data items 4 and 5 illustrated in FIG. 3. More specifically, correlation coefficient calculator 1011 calculates the correlation coefficients from $y_{11}$ and $y_{12}$, $y_{21}$ and $y_{22}$, $Y_{31}$ and $y_{32}$, $y_{41}$ and $y_{42}$, and $y_{51}$ and $y_{52}$ in data items 1 and 2. In other words, in FIG. 3, since the unit data collection is made up of unit data 1 to unit data 5, the correlation coefficients are calculated from unit data 1 to unit data 5 in all the pairs of data items.

The following describes a method for calculating the correlation coefficients when the unit data collection illustrated in FIG. 3 is generalized. Suppose that the number of data items of the unit data collection is k and the number of samples in the unit data collection is n, the unit data in the data items can be expressed as $y_{ij}$ (i=1, 2, . . . , n, and j=1, 2, . . . , k). Furthermore, the average value of unit data $y_{ij}$ (i=1, 2, . . . , n) in data items j=1, 2, . . . , k) is $m_j$, and the standard deviation thereof is $\rho_j$. In this case, first, correlation coefficient calculator 1011 scales the unit data in the data items using Expression 1. Thus, the average value of the Mahalanobis distances (hereinafter also referred to as MD) of the unit data collection is 1.

$$Y_{ij}=(y_{ij}-m_j)/\rho_j \qquad \text{Expression 1}$$

In this expression, i=1, 2, . . . , n and j=1, 2, . . . , k.

Using the unit data collection after scaling, correlation coefficient calculator 1011 calculates the correlation between the data items, that is, the correlation coefficient of data in column i and column j, according to Expression 2.

[Math. 1]

$$r_{ij}(\Sigma Y_{pi} \times Y_{pj})/n(p:1\sim n) \qquad \text{Expression 2}$$

Therefore, by calculating the correlation coefficients of all the plurality of data items of the unit data collection according to Expression 2, correlation coefficient calculator 1011 can generate correlation matrix R such as that shown as Expression 3.

[Math. 2]

$$R = \begin{pmatrix} 1 & r_{12} & \ldots & r_{1k} \\ r_{21} & 1 & \ldots & r_{2k} \\ \vdots & \vdots & & \vdots \\ r_{k1} & r_{k2} & \ldots & 1 \end{pmatrix} \qquad \text{Expression 3}$$

In the present embodiment, MD value calculator 102 to be described later is described as calculating inverse matrix $R^{-1}$ of the correlation matrix, such as that shown as Expression 4, but correlation coefficient calculator 1011 may calculate inverse matrix $R^{-1}$.

[Math. 3]

$$R^{-1} = \begin{pmatrix} a_{11} & a_{12} & \ldots & a_{1k} \\ a_{21} & a_{22} & \ldots & a_{2k} \\ \vdots & \vdots & & \vdots \\ a_{k1} & a_{k2} & \ldots & a_{kk} \end{pmatrix} \qquad \text{Expression 4}$$

Note that in the present embodiment, correlation coefficient calculator 1011 is not required to calculate, from the unit data collection, the correlation coefficient indicating the relationship between every pair of data items among the plurality of data items. Correlation coefficient calculator 1011 may calculate the correlation coefficients of all the grouped data items. This eliminates the need to calculate the correlation coefficients of every pair of data items among the plurality of data items of the unit data collection; thus, it is possible to reduce the amount of calculation. Furthermore, at the time of calculating the inverse matrix, the correlation matrix made up of the correlation coefficients of all the grouped data items may be used, and thus the amount of calculation can be smaller than that in the case where no grouping is performed.

«Grouping Unit 1012»

Grouping unit 1012 groups the unit data in the unit data collection into two or more groups each including at least one of the plurality of data items. This will be described using the example illustrated in FIG. 3 and FIG. 4; grouping unit 1012 groups five data items into two groups. More specifically, data items 1 to 5 are grouped into two groups, namely, group 1 made up of data items 1 and 2 and group 2 made up of data items 3 to 5. FIG. 4 shows an example where when the predetermined number of groups is two, grouping is performed so that the number of groups becomes 2.

In other words, in the case where grouping unit 1012 groups the unit data in the unit data collection into two or more groups, the number of groups may be determined in advance. Therefore, grouping unit 1012 may allocate the plurality of data items of the unit data collection to the determined number of groups to group the plurality of data items into two or more groups.

Note that the grouping method is not limited to a method for grouping into the predetermined number of groups, but may be a method for grouping according to the predetermined number of data items or may be a method in which the correlation coefficients of the data items of the unit data collection are used.

Specifically, for example, in the case where grouping unit 1012 groups the unit data in the unit data collection into two or more groups, grouping unit 1012 may determine the number of data items to be included in each of the two or more groups, and groups the plurality of data items of the unit data collection according to the determined number of data items to group the unit data into the two or more groups.

Furthermore, for example, grouping unit 1012 may obtain and use the correlation coefficients of the data items of the unit data collection calculated by correlation coefficient calculator 1011. More specifically, in the case where grouping unit 1012 groups the unit data in the unit data collection into two or more groups, grouping unit 1012 obtains the correlation coefficient indicating the relationship between every pair of data items among the plurality of data items of the unit data collection. Grouping unit 1012 sorts, in descending order, the plurality of correlation coefficients obtained, and determines the upper limit of the total number of data items to be included in each of the two or more groups. Subsequently, grouping unit 1012 may classify a pair of data items indicating the correlation coefficients in descending order, as one of the two or more groups according to the determined upper limit of the number of data items, to group the unit data into the two or more groups. Here, in the classifying, when one of the pair of data items indicating the correlation coefficient overlaps a data item included in a previous classification group and the total number of data items included in the previous classification group is smaller than the upper limit of the total number determined, grouping unit 1012 may classify the pair of data items indicating the correlation coefficient as the previous classification group.

Furthermore, for example, grouping unit 1012 may cause correlation coefficient calculator 1011 to calculate the correlation coefficient of the selected pair of data items, and perform the grouping process using a threshold value. More specifically, in the case where grouping unit 1012 groups the unit data in the unit data collection into two or more groups, grouping unit 1012 obtains the correlation coefficient indicating the relationship between the selected pair of data items among the plurality of data items, and when the obtained correlation coefficient is greater than or equal to the threshold value, classifies the selected pair of data items as one of the two or more groups. Subsequently, grouping unit 1012 may repeat such classification for every pair of data items among the plurality of data items. It is sufficient that upon the repetitive classification for every pair, grouping unit 1012 classify one or more data items that have not been classified as one of said two or more groups, as one of the two or more groups that has not been used during the repetitive classification for every pair. In these manners, grouping unit 1012 may group data items having large correlation coefficients to group the unit data in the unit data collection into two or more groups.

«Per-Group Unit Space Calculator 1013»

Per-group unit space calculator 1013 calculates, as a per-group unit space, a unit space in each of two or more per-group unit data collections which are unit data collections obtained by grouping the unit data into two or more groups. This will be described using the example illustrated in FIG. 4; per-group unit space calculator 1013 determines, as per-group unit spaces in groups 1, 2, unit data included in groups 1, 2 obtained by the grouping process of grouping unit 1012. More specifically, per-group unit space calculator 1013 determines, as a per-group unit space in group 1, $y_{11}$ and $y_{12}$, $y_{21}$ and $y_{22}$, $y_{31}$ and $y_{32}$, $y_{41}$ and $y_{42}$, and $y_{51}$ and $y_{52}$ in data items 1 and 2 in group 1. Furthermore, per-group unit space calculator 1013 determines, as a per-group unit space in group 2, $y_{13}$ to $y_{15}$, $y_{23}$ to $y_{25}$, $y_{33}$ to $y_{35}$, $y_{43}$ to $y_{45}$, and $y_{53}$ to $y_{55}$ in data items 3 to 5 in group 2. In other words, per-group unit space calculator 1013 determines, as per-group unit spaces, a unit space formed of all the unit data belonging to group 1 and a unit space formed of all the unit data belonging to group 2.

Note that per-group unit space calculator 1013 may scale the data items in each of the per-group unit spaces determined, cause correlation coefficient calculator 1011 to calculate correlation coefficients of each of the per-group unit spaces after scaling, and thus obtain the correlation coefficients. A method for scaling the data items in each of the per-group unit spaces to calculate the correlation coefficients is the same as or similar to the above-described method in which Expressions 1 and 2 are used, and thus description of said method will be omitted.

<MD Value Calculator 102>

Using the per-group unit space calculated, MD value calculator 102 calculates a first Mahalanobis distance of a corresponding per-group unit data collection. Furthermore, using each per-group unit space calculated, MD value calculator 102 calculates a second Mahalanobis distance of the signal data collection in a corresponding data item. In the present embodiment, MD value calculator 102 includes per-group unit data collection MD calculator 1021 and per-group signal data collection MD calculator 1022, as illustrated in FIG. 2.

«Per-Group Unit Data Collection MD Calculator 1021»

FIG. 5 is a diagram illustrating one example of the Mahalanobis distance of the unit data collection using a per-group unit space according to the embodiment. FIG. 5 illustrates an example of the Mahalanobis distances of the unit data collection in FIG. 3 that have been calculated using the per-group unit spaces determined from groups 1, 2 illustrated in FIG. 4. In FIG. 5, the Mahalanobis distance calculated using the per-group unit space in group 1 is denoted as MD1. Similarly, the Mahalanobis distance calculated using the per-group unit space in group 2 is denoted as MD2.

Using the per-group unit space calculated by unit space calculator 101, per-group unit data collection MD calculator 1021 calculates the first Mahalanobis distance of the corresponding per-group unit data collection. This will be described using the example illustrated in FIG. 4 and FIG. 5. Using the per-group unit spaces formed of all the unit data belonging to groups 1, 2 in FIG. 4, per-group unit data collection MD calculator 1021 calculates the Mahalanobis distances of the respective unit data belonging to said groups 1, 2. More specifically, using the per-group unit space formed of all the unit data belonging to group 1 illustrated in FIG. 4, per-group unit data collection MD calculator 1021 calculates $MDr_{11}$ to $MDr_{15}$, which are the Mahalanobis distances of unit data 1 to 5. Here, all the unit data belonging to group 1 are $y_{11}$, $y_{12}$, $y_{21}$, $y_{22}$, $y_{31}$, $y_{32}$, $y_{41}$, $y_{42}$, $y_{51}$, and $y_{52}$. Similarly, using the per-group unit space formed of all the unit data belonging to group 2 illustrated in FIG. 4, per-group unit data collection MD calculator 1021 calculates $MDr_{21}$ to $MDr_{25}$, which are the Mahalanobis distances of unit data 1 to 5. Here, all the unit data belonging to group 2 are $y_{13}$ to $y_{15}$, $y_{23}$ to $y_{25}$, $y_{33}$ to $y_{35}$, $y_{43}$ to $y_{45}$, and $y_{53}$ to $y_{55}$.

In the present embodiment, per-group unit data collection MD calculator 1021 calculates inverse matrix $R^{-1}$ of correlation matrix R made up of correlation coefficients of each of the per-group unit spaces. Note that a method for calculating inverse matrix $R^{-1}$ is the same as or similar to the above-described method in which Expression 4 is used, and thus description of said method will be omitted. Next, per-group unit data collection MD calculator 1021 calculates matrix Y by scaling, using average value $m_j$ and standard deviation $\rho_j$ of unit data $y_{ij}$ included in the per-group unit data collection, y which is a column vector of unit data $y_{ij}$ included in the per-group unit data collection, as in Expression 1. Subsequently, using column vector $Y_j$ (j=1, 2, . . . , k) and transposed vector $Y_j^T$ thereof, per-group unit data collection MD calculator 1021 performs calculation as in Expression 5, and thus calculates the first Mahalanobis distance, that is, MD, of the per-group unit data collection. Here, column vector $Y_j$ (j=1, 2, . . . , k) represents a column vector having $Y_{ij}$ (i=1, 2, . . . , n) as an element. Note that in Expression 5, k is the number of data items of the per-group unit data collection. In this manner, per-group unit data collection MD calculator 1021 can calculate multidimensional distances from the center of the per-group unit space in the per-group unit data collection, namely, the first Mahalanobis distance.

$$MD = Y_j R^{-1} Y_j^T / k \quad \text{Expression 5}$$

《Per-Group Signal Data Collection MD Calculator 1022》

FIG. 6 is a diagram illustrating one example of the Mahalanobis distance of the signal data collection using a per-group unit space according to the embodiment. FIG. 6 illustrates an example of the Mahalanobis distances of the signal data collection in FIG. 3 that have been calculated using the per-group unit spaces determined from groups 1, 2 illustrated in FIG. 4. Note that substantially the same elements as those in FIG. 5 are given the same names, and description thereof will be omitted.

Using each per-group unit space calculated by unit space calculator 101, per-group signal data collection MD calculator 1022 calculates the second Mahalanobis distance of the signal data collection in the corresponding data item. This will be described using the example illustrated in FIG. 4 and FIG. 6. Using the per-group unit spaces formed of all the unit data belonging to groups 1, 2 in FIG. 4, per-group signal data collection MD calculator 1022 calculates the Mahalanobis distances of the respective signal data in the data items belonging to said groups 1, 2.

More specifically, using the per-group unit space formed of all the unit data belonging to group 1 in FIG. 4, per-group signal data collection MD calculator 1022 calculates $MDs_{11}$, $MDs_{12}$, which are the respective Mahalanobis distances of signal data 1, 2. Similarly, using the per-group unit space formed of all the unit data belonging to group 2 in FIG. 4, per-group signal data collection MD calculator 1022 calculates $MDs_{21}$, $MDs_{22}$, which are the respective Mahalanobis distances of signal data 1, 2.

In the present embodiment, per-group signal data collection MD calculator 1022 calculates the Mahalanobis distance of the signal data collection using inverse matrix $R^{-1}$ corresponding to each per-group unit space calculated by per-group unit data collection MD calculator 1021. More specifically, first, per-group signal data collection MD calculator 1022 calculates a matrix by scaling, using average value $m_j$ and standard deviation $\rho_j$ used in the corresponding per-group unit space, a column vector of the data included in the signal data collection. Subsequently, using the column vector in the calculated matrix, a transposed vector thereof, and inverse matrix $R^{-1}$ corresponding to each per-group unit space, per-group signal data collection MD calculator 1022 performs calculation as in Expression 5, and thus calculates the second Mahalanobis distance, that is, MD, of the signal data collection. In this manner, per-group signal data collection MD calculator 1022 can calculate the second Mahalanobis distance from the multidimensional distances from the center of the per-group unit space in the signal data collection corresponding to the per-group unit space.

<Linear Combination Calculator 103>

Linear combination calculator 103 calculates the first linear combination of the plurality of first Mahalanobis distances calculated by per-group unit data collection MD calculator 1021. Furthermore, linear combination calculator 103 calculates the second linear combination of the plurality of second Mahalanobis distances calculated by per-group signal data collection MD calculator 1022. Here, each coefficient in linear form to be used to calculate the first linear combination and the second linear combination is a unit fraction where a denominator is the number of groups in the two or more groups.

In the present embodiment, linear combination calculator 103 calculates the first linear combination of the plurality of first Mahalanobis distances of each unit data in the unit data collection calculated by per-group unit data collection MD calculator 1021. This will be described using the example illustrated in FIG. 5; linear combination calculator 103 calculates the linear combination of $MDr_{11}$ and $MDr_{21}$, which are the plurality of first Mahalanobis distances of unit data 1. More specifically, as indicated in Expression 6, there are two terms in linear form; therefore, linear combination calculator 103 sets the coefficient of each of the terms in linear form to ½, calculates the linear combination of $MDr_{11}$ and $MDr_{2i}$, and thus calculates the first linear combination of unit data 1.

First linear combination of unit data $1 = \tfrac{1}{2} MDr_{11} + \tfrac{1}{2} MDr_{21}$   Expression 6

Similarly, linear combination calculator 103 sets the coefficient of each of the terms in linear form to ½, calculates the linear combination of $MDr_{12}$ and $MDr_{22}$, which are the plurality of first Mahalanobis distances of unit data 2, and calculates the linear combination of $MDr_{13}$ and $MDr_{23}$, which are the plurality of first Mahalanobis distances of unit data 3. Linear combination calculator 103 sets the coefficient of each of the terms in linear form to ½, calculates the linear combination of $MDr_{14}$ and $MDr_{24}$, which are the plurality of first Mahalanobis distances of unit data 4, and calculates the linear combination of $MDr_{15}$ and $MDr_{25}$, which are the plurality of first Mahalanobis distances of unit data 5.

Furthermore, linear combination calculator 103 calculates the second linear combination of the plurality of second Mahalanobis distances of each signal data in the signal data collection calculated by per-group signal data collection MD calculator 1022. This will be described using the example illustrated in FIG. 6; linear combination calculator 103 calculates the linear combination of $MDs_{11}$ and $MDs_{21}$, which are the plurality of second Mahalanobis distances of signal data 1. More specifically, as indicated in Expression 7, linear combination calculator 103 sets the coefficient of each of the terms in linear form to ½, calculates the linear combination of $MDs_{11}$ and $MDs_{21}$, and thus calculates the second linear combination of signal data 1.

Second linear combination of signal data $1 = \tfrac{1}{2} MDs_{11} + \tfrac{1}{2} MDs_{21}$   Expression 7

Similarly, linear combination calculator 103 sets the coefficient of each of the terms in linear form to ½, calculates the linear combination of $MDs_{12}$ and $MDs_{22}$, which are the plurality of second Mahalanobis distances of signal data 2, and thus calculates the second linear combination of signal data 2.

In this manner, using, as a coefficient, a unit fraction where a denominator is the calculated number of groups used in grouping, linear combination calculator 103 calculates the second linear combination of the same number of Mahalanobis distances as the groups.

Note that each of the coefficients in the terms in linear form used to calculate the first linear combination and the second linear combination is not limited to an unweighted value such as a unit fraction where the denominator is the number of groups, and may be a value weighted by an average value of correlation coefficients or the like.

[Outputter 13]

Outputter 13 compares the first and second linear combinations calculated by linear combination calculator 103 and outputs the comparison result as a first comparison result. Outputter 13 may compare, for each of the signal data collections, the plurality of second Mahalanobis distances calculated, and output the comparison result as a second comparison result. For example, when the second linear combination of one signal data collection is determined according to the second comparison result as having a value significantly greater than the first linear combination of every unit data collection and greater than or equal to a threshold value, said signal data collection can be determined as being abnormal.

Furthermore, outputter 13 may perform an item diagnosis for analyzing, based on the second comparison result, which of the plurality of data items has become abnormal, and output the result. For example, when the analysis result of the item diagnosis shows that a data item in one signal data collection has become abnormal, outputter 13 may output warning information indicating the data item that has become abnormal.

[Operation of Evaluation Device 1]

One example of the operation of evaluation device 1 configured as described above will be described below.

Figure 7A:
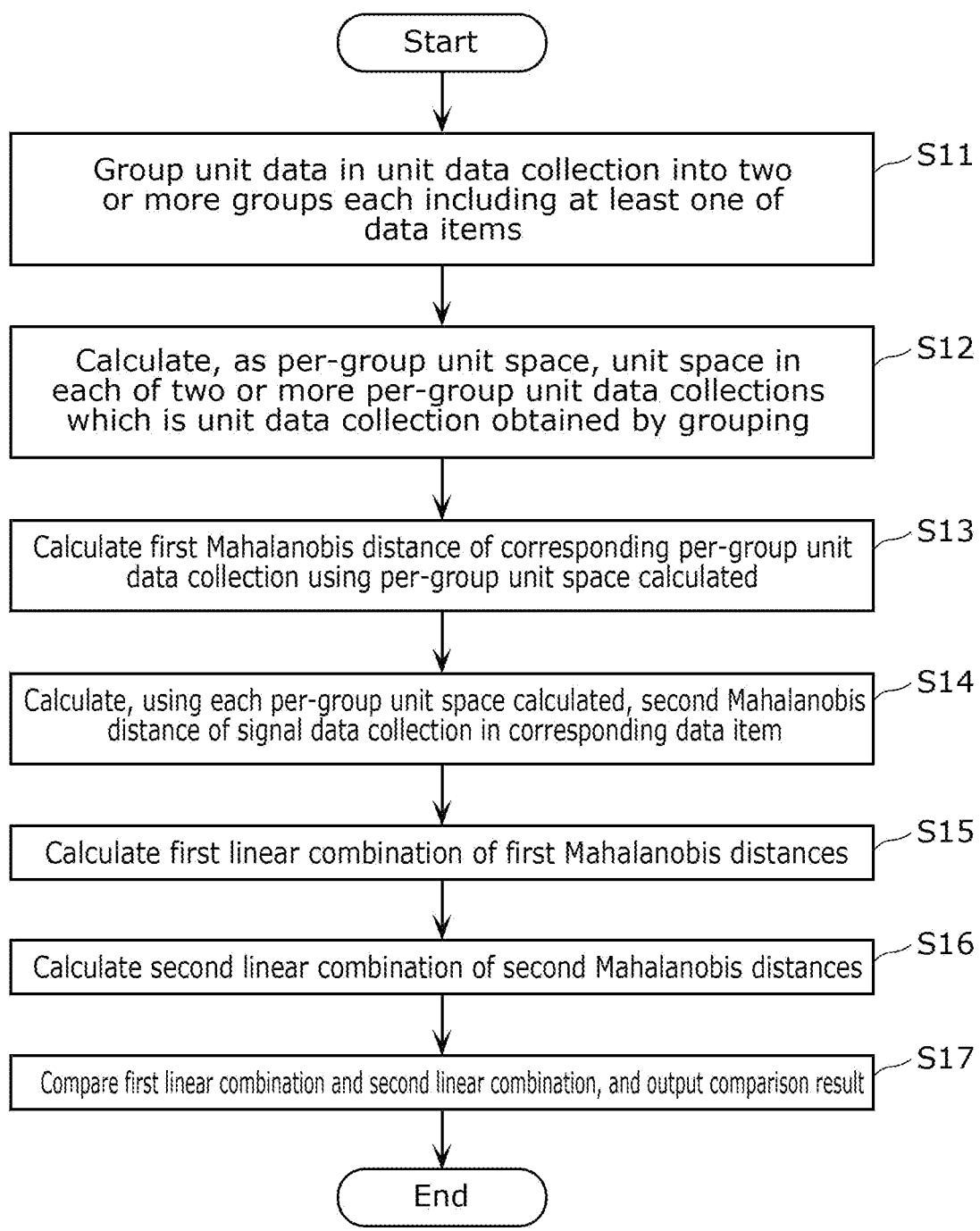
FIG. 7A is a flowchart illustrating the overall operation of an evaluation device according to an embodiment.

FIG. 7A is a flowchart illustrating the overall operation of evaluation device 1 according to the present embodiment.

Using the CPU and the memory, evaluation device 1 performs the processes in Steps S11 to S17 indicated below. More specifically, first, evaluation device 1 groups the unit data in the unit data collection into two or more groups including at least one of the plurality of data items (S11). Next, evaluation device 1 calculates, as a per-group unit space, a unit space in each of two or more per-group unit data collections which are unit data collections obtained by grouping (S12). Next, using the calculated per-group unit space, evaluation device 1 calculates the first Mahalanobis distance of a corresponding per-group unit data collection (S13). Next, using each per-group unit space calculated, evaluation device 1 calculates the second Mahalanobis distance of the signal data collection in a corresponding data item (S14). Next, evaluation device 1 calculates the first linear combination of the plurality of first Mahalanobis distances calculated in Step S13 (S15). Here, using the plurality of first Mahalanobis distances calculated in Step S13, evaluation device 1 calculates the first linear combination of each of the per-group unit data collections. Next, evaluation device 1 calculates the second linear combination of the plurality of second Mahalanobis distances calculated in Step S14 (S16). Here, using the plurality of second Mahalanobis distances calculated in Step S14, evaluation device 1 calculates the second linear combination of each of the signal data collections corresponding to the per-group unit space. At the end, evaluation device 1 compares the first linear combination calculated in Step S15 and the second linear combination calculated in Step S16, and outputs the comparison result (S17).

Hereinafter, one example of the detailed operation in Step S11 will be described with reference to FIG. 7B.

Figure 7B:
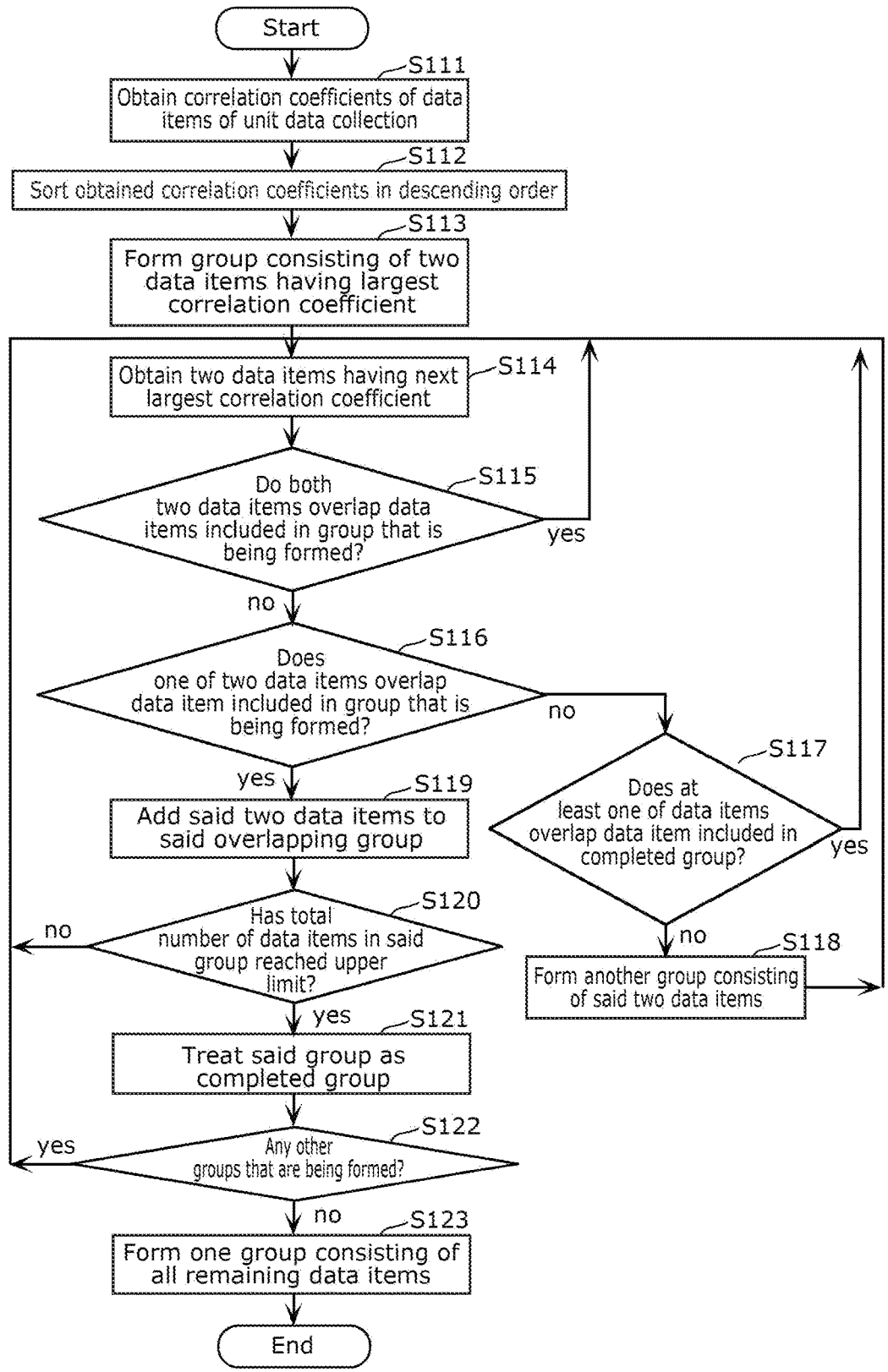
FIG. 7B is a flowchart illustrating one example of the detailed operation of Step S11 illustrated in FIG. 7A.

FIG. 7B is a flowchart illustrating one example of the detailed operation of Step S11 illustrated in FIG. 7A. FIG. 7B illustrates the detailed operation performed in the case where data items having a large correlation coefficients are grouped to group the data unit in the unit data collection into two or more groups.

Specifically, in Step S11, first, evaluation device 1 obtains the correlation coefficients of the data items of the unit data collection (S111). Evaluation device 1 performs calculation using two unit data in the respective data items of the unit data collection and thus obtains the correlation coefficient of the data items of the unit data collection. Subsequently, evaluation device 1 sorts the obtained correlation coefficients in descending order (S112) and forms a group that consists of two data items having the largest correlation coefficient (S113).

Subsequently, evaluation device 1 obtains two data items having the second largest correlation coefficient (S114) and determines whether or not both the obtained two data items overlap the data items included in the group that is being formed (S115).

When there is no overlap in Step S115 (no in S115), evaluation device 1 determines whether or not one of the obtained two data items overlaps a data item included in the group that is being formed (S116).

When there is no overlap in Step S116 (no in S116) and none of the data items overlaps the data items included in the completed group (no in S117), evaluation device 1 forms another group that consists of said two non-overlapping data items (S118). Note that in Step S115, when there is an overlap with a data item included in the completed group (yes in S117), evaluation device 1 does nothing, but is brought back to Step S116.

On the other hand, when there is an overlap in Step S116 (yes in S116), evaluation device 1 adds said two data items to the overlapping group (S119) and checks whether or not the total number of data items in that group has reached the upper limit (S120).

When reaching the upper limit is confirmed in Step S120 (yes in S120), evaluation device 1 treats said group as a completed group (S121) and checks whether or not there are any other groups that are being formed (S122).

When there are no other groups that are being formed in Step S122 (no in S122), one group that consists of all the remaining data items is formed (S123), and the processing ends.

Note that when there is an overlap in Step S115 (yes in S115) and at least one of the data items overlaps a data item included in the completed group in Step S117 (yes in S117), the processing is brought back to Step S114 and the subsequent processes are repeated. Furthermore, when the total number of data items has not reached the upper limit in Step S120 (no in S120) and when there is another group that is being formed in Step S122 (yes in S122), the processing is brought back to Step S114 and the subsequent processes are repeated.

In this manner, evaluation device 1 groups the unit data in the unit data collection into two or more groups by grouping the plurality of data items of the unit data collection into two or more groups.

Advantageous Effects, Etc.

In the above-described manner, evaluation device 1 groups the plurality of data items of the unit data collection, thus divides the unit data collection into two or more groups, calculates the Mahalanobis distance of the signal data collection for each group, and calculates a linear combination of the Mahalanobis distances calculated. Subsequently, the signal data collection is evaluated using the calculated linear combination. Thus, evaluation device 1 allows a reduction in the amount of calculation for the Mahalanobis distance such as inverse matrix calculation even when there are many data items, therefore making it possible to shorten the calculation time. For example, without the grouping, the amount of a series of calculation steps for calculating the Mahalanobis distance is proportional to the cube of the total number of items. In contrast, when grouping is applied as in the present embodiment, the amount of calculation equals a value obtained by dividing the amount of calculation without grouping by the square of the number of groups, meaning that the amount of calculation can be reduced.

The foregoing describes the case where a limit is set on the number of pieces of data in each group, but substantially the same effects can be obtained even in the case where no limit is set on the number of pieces of data or the case where a limit is set on the number of groups, for example.

Next, an overview including the process of the MT system and the possible results of using the MT system will be described.

Figure 8:
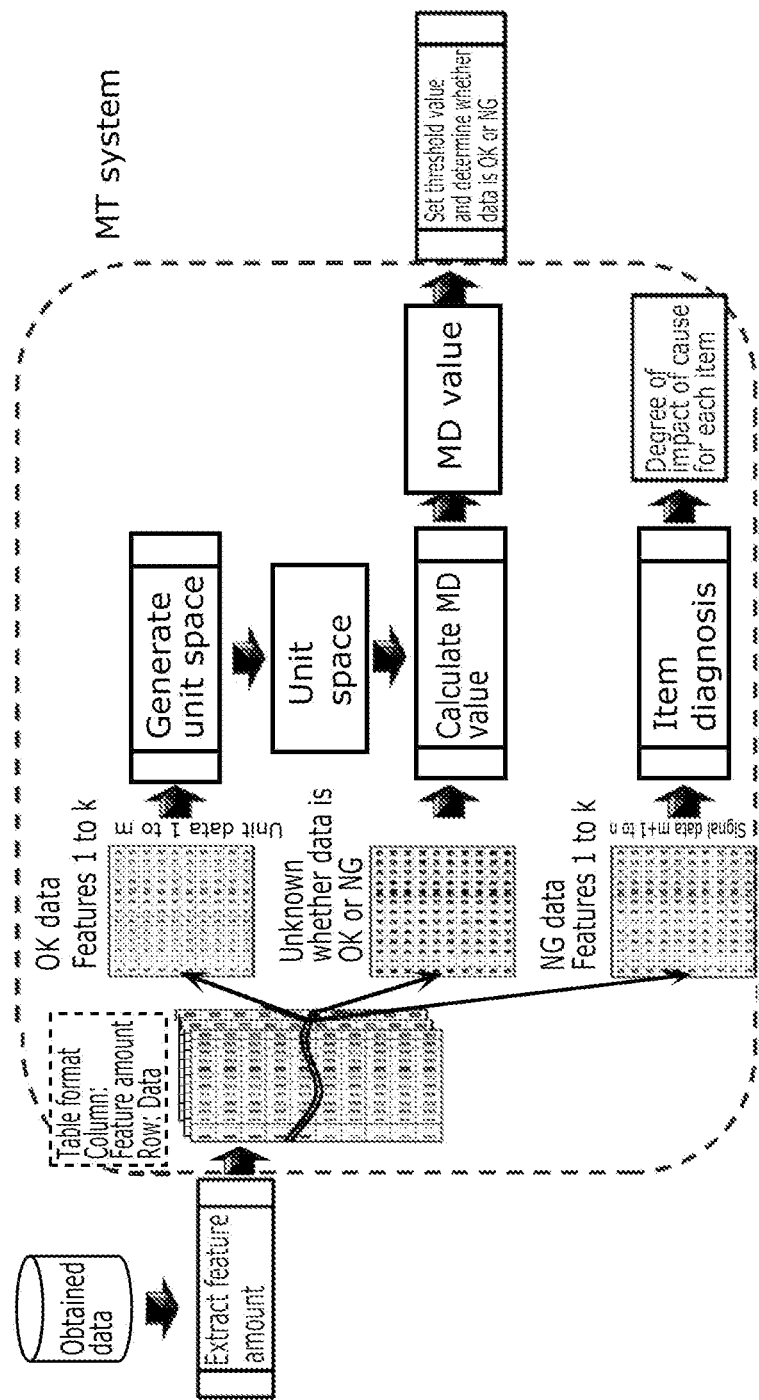
FIG. 8 is a conceptual diagram for describing the overview of the MT system.

FIG. 8 is a conceptual diagram for describing the overview of the MT system.

First, suppose that obtained data such as production facility data is stored in a storage device or the like. Note that examples of the production facility data may include physical data such as time-series temperature data of each of the positions of facilities spaced apart at a regular distance, physical data of products at each of the facilities, and scalar data obtained by converting physical data into feature amounts.

In the MT system, first, feature amounts 1 to k are extracted from the obtained data, and feature amounts 1 to k and data thereof are arranged in a table format, for example. Examples of the feature amount include a differential characteristic value, an integral characteristic value, a waveform characteristic value, the maximum value, and the minimum value of physical data. For example, waveform data is extracted from production facility data such as temperatures, and the waveform data is arranged in the table format for data items.

Next, unit data 1 to m regarded as OK data, in other words, being normal, are determined from among the data arranged in the table format, and a unit space is generated. At this time, the correlation matrix of the generated unit space, the inverse matrix of said correlation matrix, and the like are calculated.

Next, using the unit space, the Mahalanobis distance (MD value) is calculated for data that cannot be identified as being OK or NG, namely, signal data m+1 to n which cannot be identified as being normal or not, among the obtained data. Subsequently, a threshold value is determined, and using the calculated MD value and said threshold value, whether or not signal data m+1 to n are normal is determined.

Note that when signal data m+1 to n are determined as NG data, in other words, being not normal, the item diagnosis may be performed on signal data m+1 to n to analyze the degree of impact of a cause for each item.

In the present embodiment, as mentioned above, the unit space illustrated in FIG. 8 is used to generate a per-group unit space for each set of feature amounts 1 to k obtained by grouping, namely, for each per-group unit data, instead of all feature amounts 1 to k extracted. Subsequently, using the per-group unit space, the MD value calculation and item diagnosis of signal data m+1 to n are performed on signal data m+1 for each set of feature amounts 1 to k obtained by grouping.

Example 1

One specific example of an evaluation method performed by evaluation device 1 according to the above-described embodiment will be described as Example 1.

Figure 10:
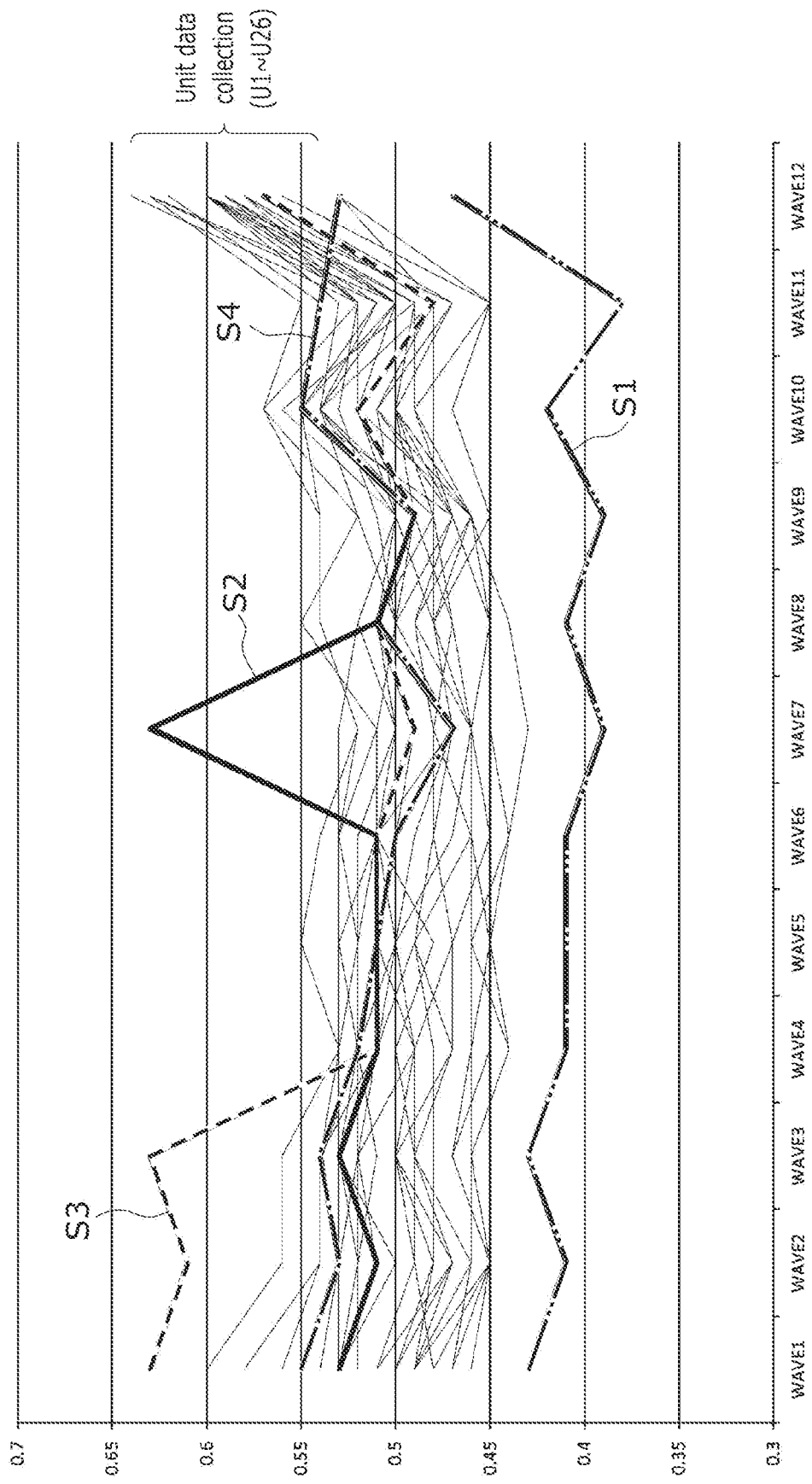
FIG. 10 is a graph of the waveform data illustrated in FIG. 9.

FIG. 9 is a diagram illustrating one example of waveform data according to Example 1. FIG. 10 is a graph of the waveform data illustrated in FIG. 9. The waveform data illustrated in FIG. 9 includes: a unit data collection (U1 to U26) which is a collection of data extracted from the data set stored in memory 11 and serving as a reference to be used to form the unit space; and a signal data collection (S1 to S4) which is a collection of data to be evaluated. The waveform data illustrated in FIG. 9 is arranged in the table format based on the data items denoted as WAVE 1 to WAVE 12. Note that the fields marked by hatching in FIG. 9 indicate the values of signal data in the signal data collection that are deviated from those in the unit data collection (U1 to U26) illustrated in FIG. 10. As illustrated in FIG. 10, compared to the unit data collection (U1 to U26), signal data S1 has a similar variation in value, in other words, a similar shape, among the plurality of data items (WAVE 1 to WAVE 12), but the values thereof are small overall. Compared to the unit data collection (U1 to U26), signal data S2 has a similar value and a similar variation in value among the plurality of data items (WAVE 1 to WAVE 12), but only the value of WAVE 7 is deviated. Compared to the unit data collection (U1 to U26), signal data S3 has a similar value and a similar variation in value among the plurality of data items (WAVE 1 to WAVE 12), but the values of WAVE 1, WAVE 2, and WAVE 3 are deviated. Compared to the unit data collection (U1 to U26), signal data S4 has a similar value and a similar variation in value among the plurality of data items (WAVE 1 to WAVE 12), but the values of WAVE 10 and WAVE 11 slope downward to the right.

[MD Value Calculation]

FIG. 11A is a diagram illustrating MD values in the MT system and MD values in the present system for the waveform data illustrated in FIG. 9. The MD value in the present system is a linear combination of the plurality of Mahalanobis distances calculated by evaluation device 1 according to the above-described embodiment grouping the plurality of data items and applying the per-group unit space formed from the unit data collection divided into two or more groups. In the present example, the unit data in the unit data collection are divided into three groups so that each of the groups include four (WAVE 1 to WAVE 4, WAVE 5 to WAVE 8, and WAVE 9 to WAVE 12) of the plurality of data items (WAVE 1 to WAVE 12). Furthermore, using the per-group unit space formed from the unit data collection divided into three groups, the respective MD values of the unit data (U1 to U26) are calculated. In FIG. 11A, the respective MD values of the unit data (U1 to U26) calculated using the per-group unit space are referred to as per-group MD values (MD1_1, MD1_2, MD1_3).

Note that in FIG. 11A, the MD values in the multi-MT system for the waveform data illustrated in FIG. 9 are also indicated as a comparative example. The MD value in the multi-MT system is one Mahalanobis distance obtained by grouping the plurality of data items, calculating the Mahalanobis distance of each group, and performing calculation using, as input, the plurality of Mahalanobis distances calculated. The multi-MT system requires at least two levels of Mahalanobis distance calculation, resulting in the amount of calculation being greater than the amount of calculation for the MD value in the MT system in which no grouping is performed and the amount of calculation for the MD value in the present system in which grouping is performed, but one level of Mahalanobis distance calculation is performed. This means that in both the present system and the multi-MT system, grouping is used in calculating the MD value, but the amount of calculation required to obtain the MD value is smaller in the present system than in the multi-MT system.

Figure 12:
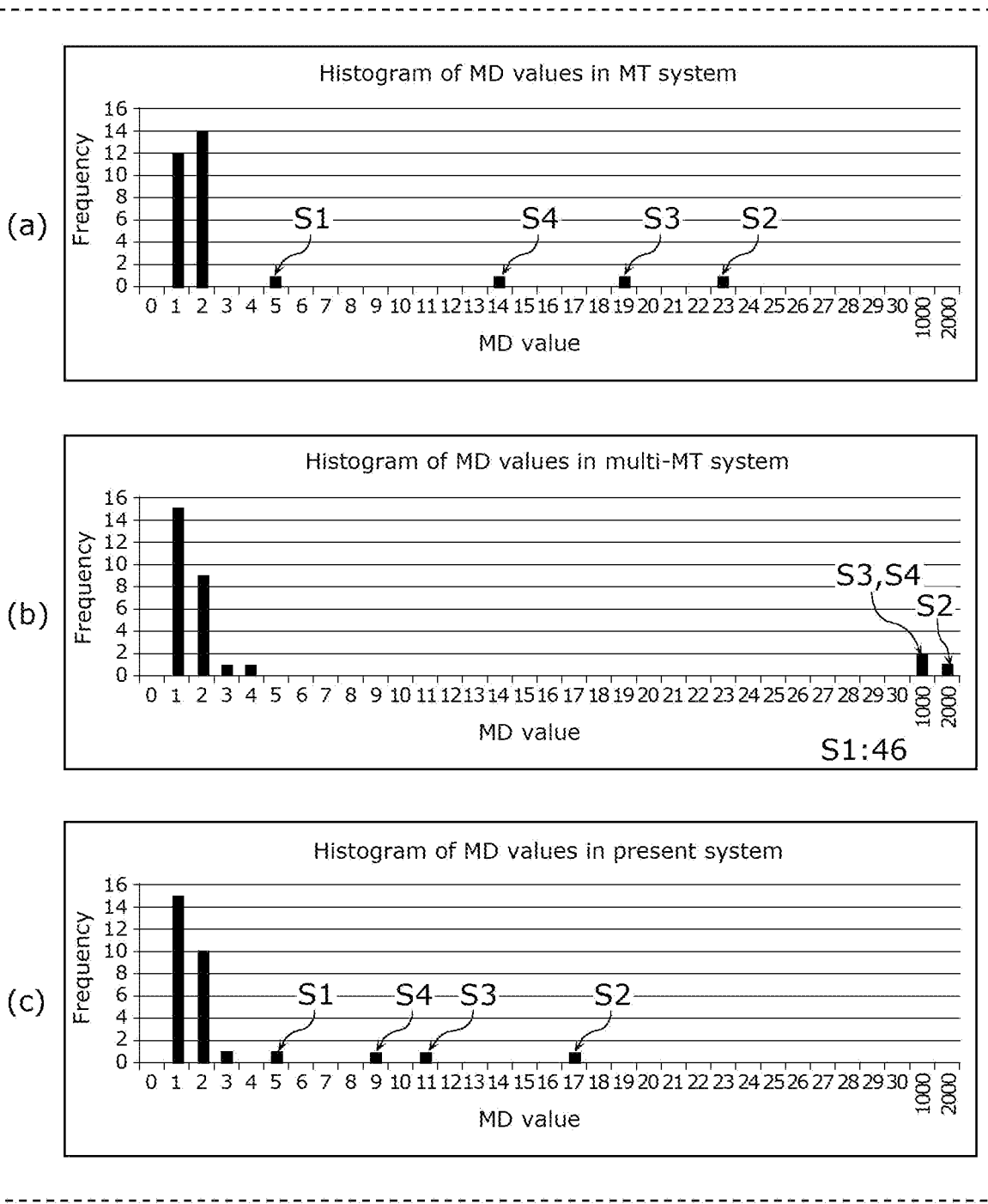
FIG. 12 is a diagram illustrating histograms of MD values in the MT system, the present system, and the multi-MT system, extracted from FIG. 11A.

FIG. 11B is a diagram illustrating MD values in the MT system, MD values in the present system, and MD values in the multi-MT system, extracted from FIG. 11A. FIG. 12 is a diagram illustrating histograms of MD values in the MT system, the present system, and the multi-MT system, extracted from FIG. 11A. In FIG. 12, (a) illustrates the histogram of MD values in the MT system extracted from FIG. 11A, (b) illustrates the histogram of MD values in the multi-MT system extracted from FIG. 11A, and (c) illustrates the histogram of MD values in the present system extracted from FIG. 11A As can be seen from FIG. 12, the MD values in the present system and the MD values in the MT system have the same tendency for signal data S1 to S4. This shows that the use of the MD values in the present system instead of the MD values in the MT system makes the amount of calculation small compared to the amount of calculation for the MD values in the MT system and also ensures the same determination as in the case where the MD values in the MT system are used.

Note that the MD values in the multi-MT system for signal data S1 to S4 are too great compared to the MD values in the unit data collection (per-group unit data collection) divided into three groups. Therefore, signal data S1 cannot be treated as gray-zone data in the normality or abnormality determination, meaning that making correct determination is difficult.

[Item Diagnosis]

FIG. 13A is a diagram illustrating the result of calculation for item diagnosis using the MT system for the data items of the signal data collection illustrated in FIG. 11A. For example, in the data item of WAVE 1 of signal data S3 determined using the MD value in the MT system as being abnormal, a value obtained by calculating the impact of the data item of WAVE 1 using an orthogonal array is entered. The same applies to the values entered in the other data items. Note that in order to enter these values, the correlation matrix of the plurality of data items of WAVE 2 to WAVE 12 is calculated, and the inverse matrix of the calculated correlation matrix is used. Furthermore, in FIG. 13A, the MD values in the MT system for the respective signal data are also indicated so as to enable comparison with the values entered in the data items.

FIG. 13B is a diagram illustrating the result of calculation for item diagnosis using the multi-MT system for per-group MD values of the signal data collection illustrated in FIG. 11A. For example, in the data item of MD1_1 of signal data S3 determined using the MD value in the multi-MT system as being abnormal, a value obtained by calculating the impact of MD1_1 using the orthogonal array is entered, as in substantially the same manner as described above. The same applies to the values entered in the other data items. Furthermore, in FIG. 13B, the MD values in the multi-MT system for the respective signal data are also indicated so as to enable comparison with the values entered in the data items.

FIG. 13C is a table used for item diagnosis using the present system for the data items of the signal data collection illustrated in FIG. 11A. The table in FIG. 13C shows the extracted per-group MD values (MD1_1, MD1_2, MD1_3) illustrated in FIG. 11A.

Figure 14:
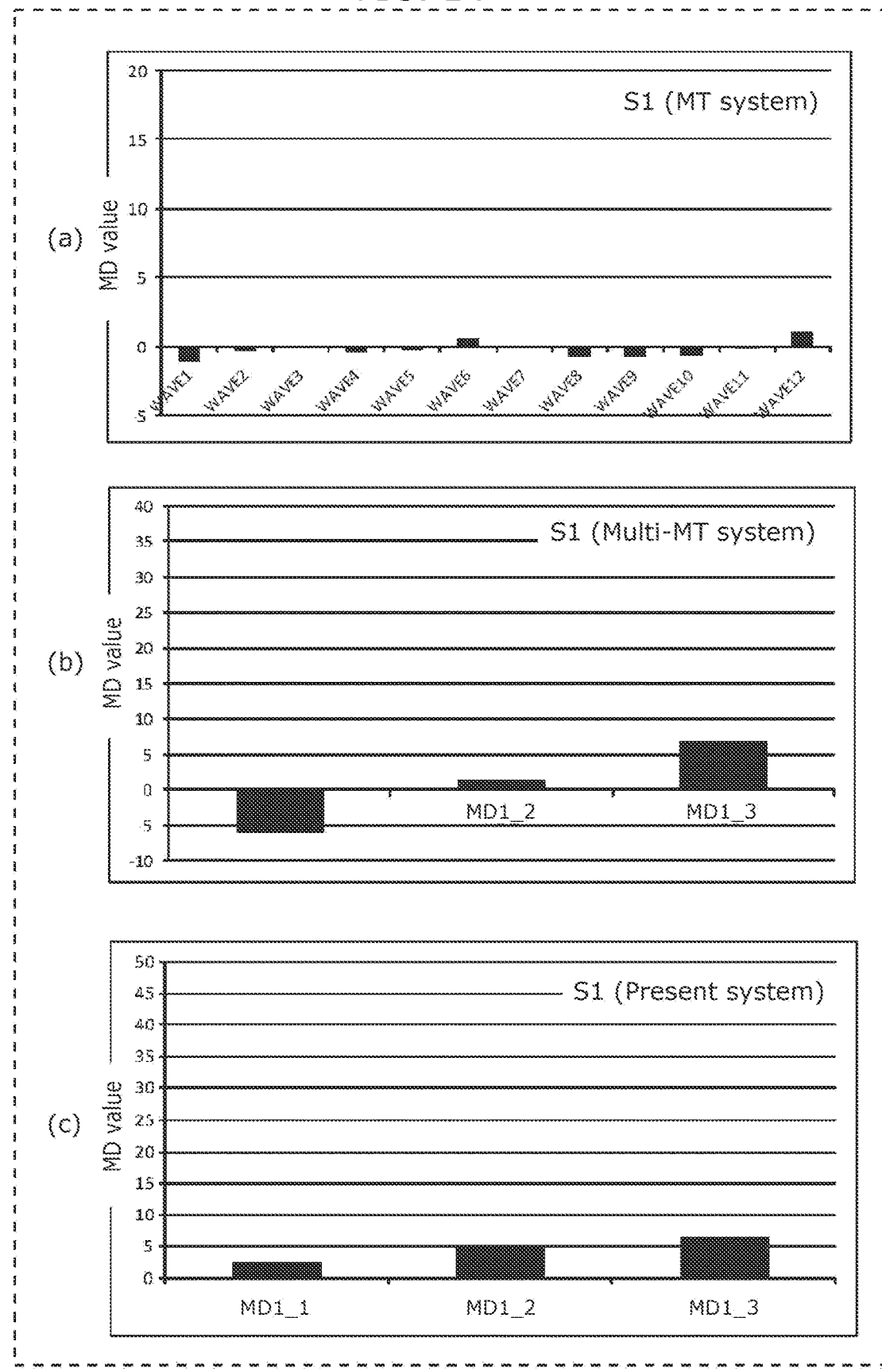
FIG. 14 is a graph for item diagnosis using the MT system, the multi-MT system, and the present system for signal data S1 illustrated in FIG. 9.
Figure 15:
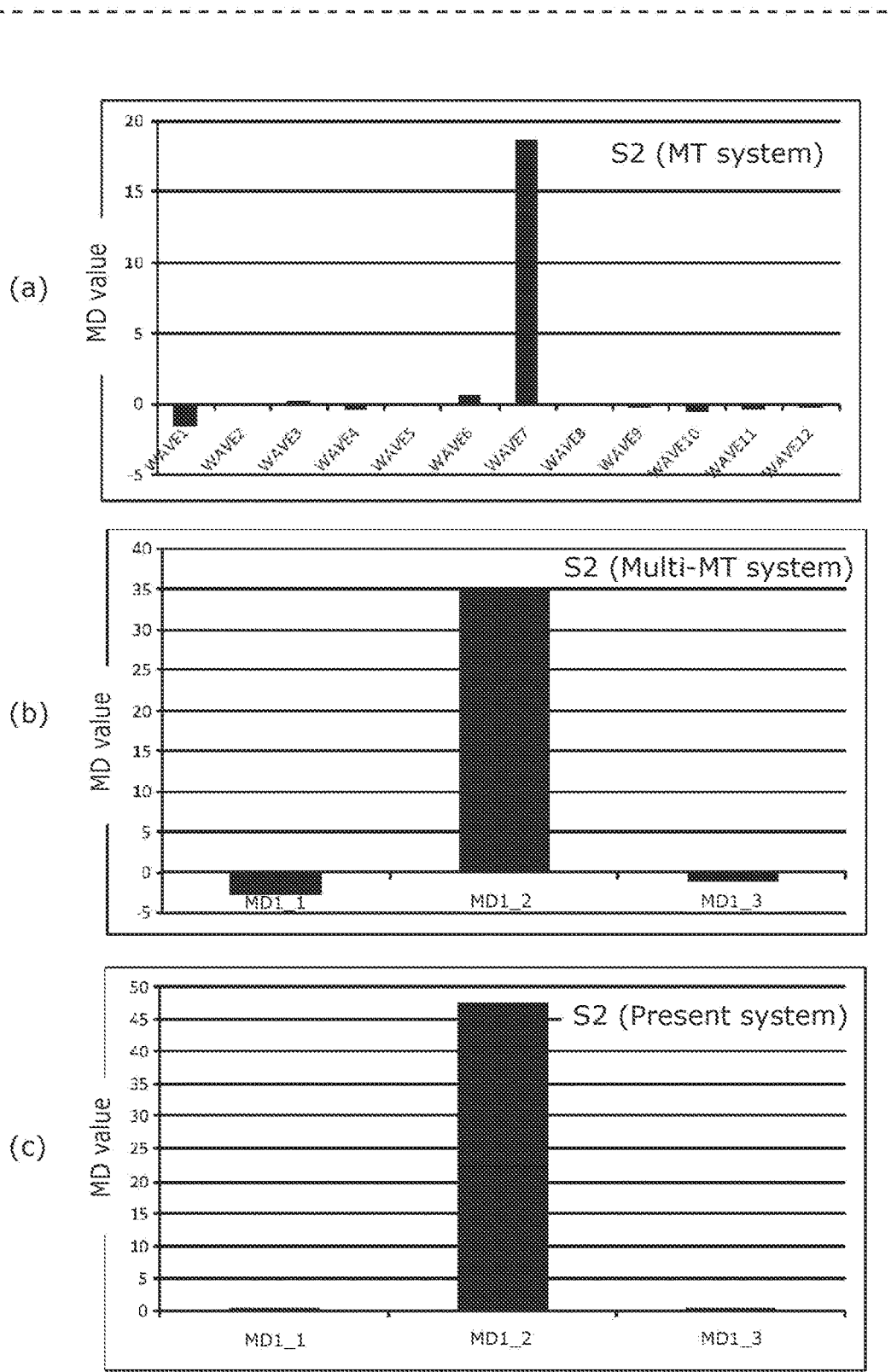
FIG. 15 is a graph for item diagnosis using the MT system, the multi-MT system, and the present system for signal data S2 illustrated in FIG. 9.
Figure 16:
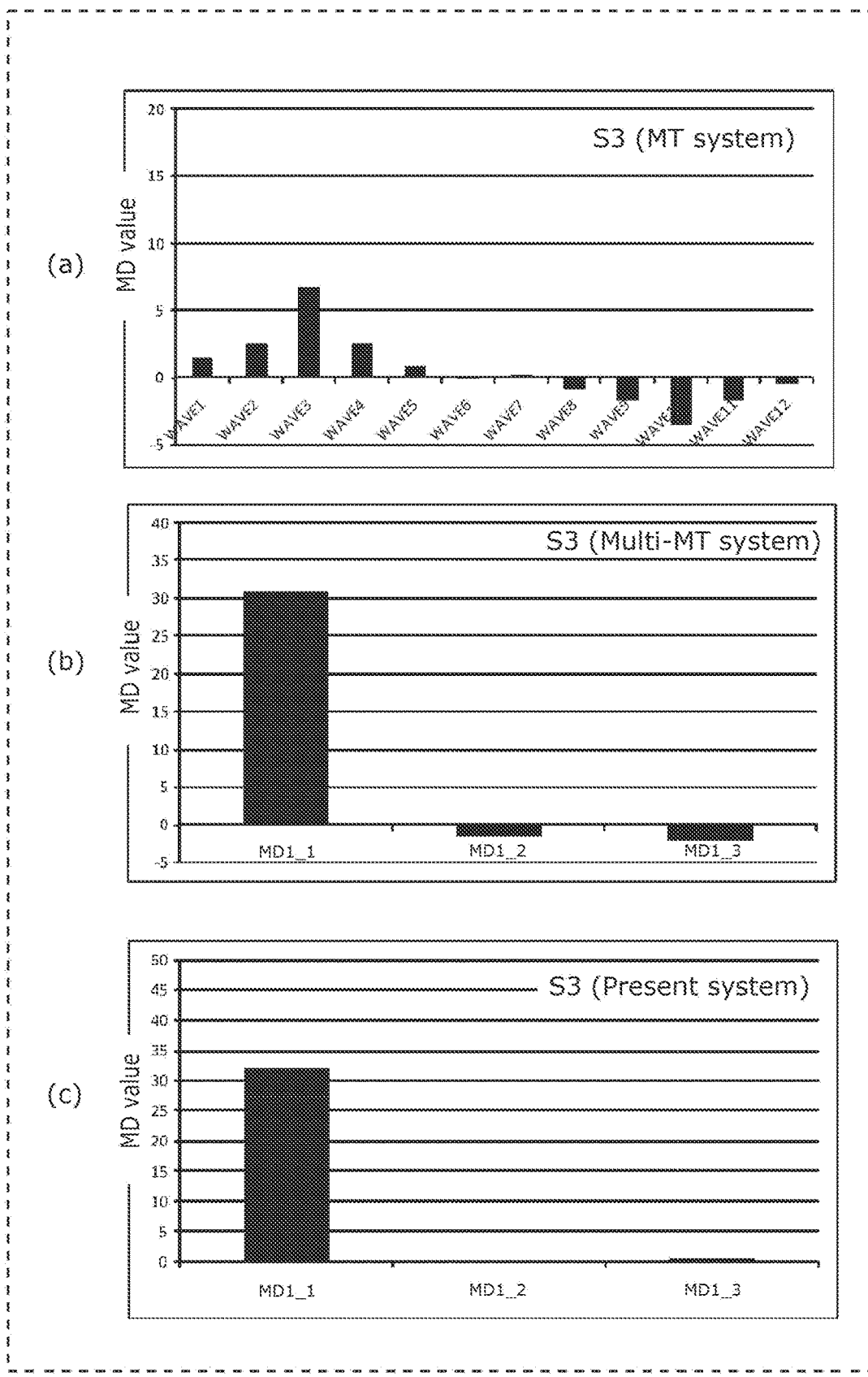
FIG. 16 is a graph for item diagnosis using the MT system, the multi-MT system, and the present system for signal data S3 illustrated in FIG. 9.
Figure 17:
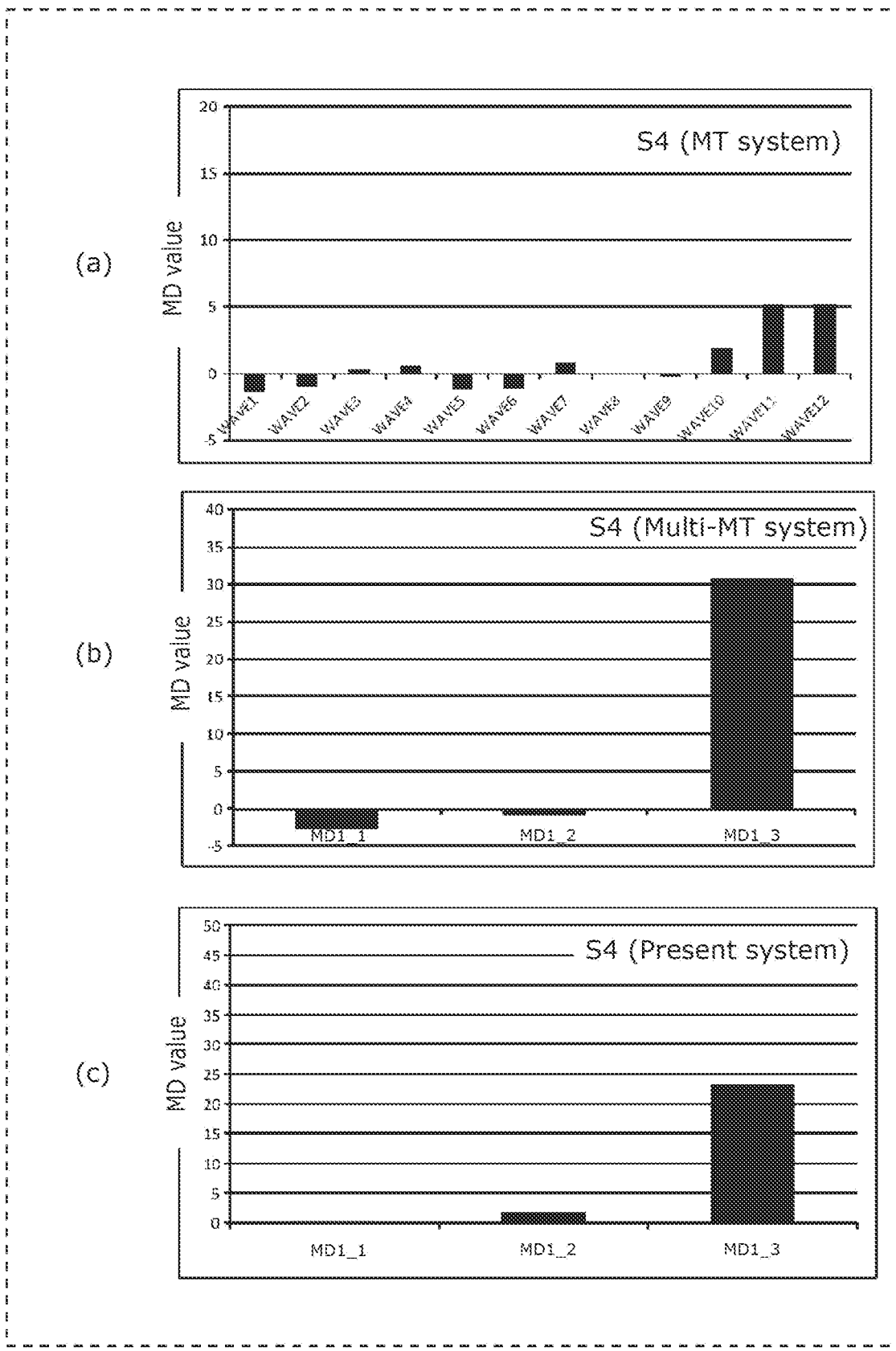
FIG. 17 is a graph for item diagnosis using the MT system, the multi-MT system, and the present system for signal data S4 illustrated in FIG. 9.

FIG. 14 is a graph for item diagnosis using the MT system, the multi-MT system, and the present system for signal data S1 illustrated in FIG. 9. In FIG. 14, (a) is a graph for item diagnosis using the MT system for signal data S1, (b) is a graph for item diagnosis using the multi-MT system for signal data S1, and (c) is a graph for item diagnosis using the present system for signal data S1. Similarly, FIG. 15 is a graph for item diagnosis using the MT system, the multi-MT system, and the present system for signal data S2 illustrated in FIG. 9. FIG. 16 is a graph for item diagnosis using the MT system, the multi-MT system, and the present system for signal data S3 illustrated in FIG. 9. FIG. 17 is a graph for item diagnosis using the MT system, the multi-MT system, and the present system for signal data S4 illustrated in FIG. 9. In FIG. 15 to FIG. 17, (a) is a graph for item diagnosis using the MT system for signal data S2 to S4. Similarly, in FIG. 15 to FIG. 17, (b) is a graph for item diagnosis using the multi-MT system for signal data S2 to S4, and (c) is a graph for item diagnosis using the present MT system for signal data S2 to S4.

As can be seen from FIG. 14 to FIG. 17, the graph for item diagnosis in the present system and the graph for item diagnosis in the multi-MT system have the same tendency for signal data S1 to S4. In other words, since this shows that the item diagnosis in the present system and the item diagnosis in the multi-MT system have substantially the same performance, the item diagnosis in the present system can be used instead of the item diagnosis in the multi-MT system. Thus, the per-group MD values of the signal data collection can be used without changes, meaning that the calculation of the correlation matrix and the inverse matrix performed for the item diagnosis in the multi-MT system is no longer necessary, allowing a reduction in the amount of calculation.

For example, regarding the item diagnosis for signal data S2, with reference to (a) in FIG. 15, the graph for the item diagnosis using the MT system shows that the MD value in the data item of WAVE 7 is extremely large, and thus the data item of WAVE 7 is a cause of the determination to the effect that signal data S2 is abnormal. With reference to (c) in FIG. 15, the graph for the item diagnosis using the present system shows that the per-group MD value of MD1_2 made up of four data items (WAVE 1 to WAVE 12) including WAVE 7 is extremely large, and thus MD1_2 is a cause of the determination to the effect that signal data S2 is abnormal. Furthermore, the item diagnosis in the MT system is performed on the four data items (WAVE 1 to WAVE 12) constituting MD1_2 determined by the item diagnosis in the present system as being abnormal; thus, it can be found that the data item of WAVE 7 is a cause of the determination to the effect that signal data S2 is abnormal. The graphs for the item diagnosis on other signal data S3, S4 show similar content although description thereof will be omitted.

In this manner, the item diagnosis using the present system is performed, and the item diagnosis using the MT system is further performed on the data item included in the group determined as being abnormal. Thus, compared to the item diagnosis using the MT system which is to be applied to all the data items, the amount of calculation can be smaller and moreover, it is possible to perform the same analysis as in the item diagnosis using the MT system which is to be applied to all the data items.

As described above, with the present system, even in the case where evaluation device 1 according to the above-described embodiment performs the item diagnosis, it is possible to reduce the amount of calculation for the Mahalanobis distance such as inverse matrix calculation, and therefore the calculation time can be shortened.

Example 2

Example 2 will describe one example of a method for grouping unit data in the unit data collection into two or more groups by using the correlation coefficients of the data items of the unit data collection.

FIG. 18 is a diagram illustrating one example of a correlation coefficient table according to Example 2. In FIG. 18, the correlation coefficients of the data items of the waveform data illustrated in FIG. 9 are indicated. The correlation coefficients indicated in FIG. 18 are calculated by evaluation device 1 according to the embodiment.

FIG. 19 is a table of the correlation coefficients indicated in FIG. 18, listed for each pair of data items. This list creation may be performed by evaluation device 1 according to the embodiment. In a number in the Pair column in the table in FIG. 19 indicates a pair of one of the numbers of the data items in the first row in FIG. 18, specifically, one of WAVE 1 to WAVE 12, and one of the numbers of the data items in the first column in FIG. 18, specifically, one of WAVE 1 to WAVE 12. For example, 0.922252 that is the correlation coefficient of WAVE 1 in the first row in FIG. 18 and WAVE 2 in the second column in FIG. 18 is indicated in Pair 1-2. The correlation coefficients indicated in FIG. 19 are calculated by evaluation device 1 according to the embodiment.

FIG. 20 is a diagram showing correlation coefficients obtained by sorting, in descending order, the correlation coefficients indicated in FIG. 19, pairs of data items corresponding to the correlation coefficients, and the process of grouping the data items into three groups.

In the present example, suppose that dividing 12 data items in the waveform data illustrated in FIG. 9 into three groups with four data items in each group is determined in advance. In this case, pair 2-3 having the largest correlation coefficient, 0.935775, is denoted as group 1, which is the first group. Pair 6-8 having the next largest correlation coefficient, 0.929843, does not overlap the numbers of the pairs, in other words, the data items, included in group 1, and therefore pair 6-8 is denoted as group 2, which is different from group 1.

Pair 1-2 having the next largest correlation coefficient, 0.922252, overlaps the number of a pair included in group 1, that is, 2, and therefore pair 1-2 is added to group 1. Similarly, pair 3-4 having the next largest correlation coefficient, 0.916117, overlaps the number of a pair included in group 1, that is, 3, and therefore pair 3-4 is added to group 1. As a result, the pairs included in group 1 are 1-2-3-4, meaning that the number of data items has reached the upper limit, and thus group 1 is treated as having been completed.

Pair 2-4 having the next largest correlation coefficient, 0.901614, is included in group 1, and thus no process is performed. Note that since adding pair 2-4 to group 1 does not change the data items included in group 1, pair 2-4 may be added to group 1. Pair 1-3 having the next largest correlation coefficient, 0.896364, is also included in group 1, and thus no process is performed.

Pair 6-7 having the next largest correlation coefficient, 0.895188, overlaps the number of a pair included in group 2, that is, 6, and therefore pair 6-7 is added to group 2. On the other hand, pair 4-5 having the next largest correlation coefficient, 0.893529, overlaps the number of a pair included in group 1, that is, 4, but no process is performed because group 1 has been completed as a result of the number of pieces of data therein having reached the upper limit.

Pair 5-6 having the next largest correlation coefficient, 0.89124, overlaps the number of a pair included in group 2, that is, 6, and therefore pair 5-6 is added to group 2. As a result, the pairs included in group 2 are 5-6-7-8, meaning that the number of data items has reached the upper limit, and thus group 2 is treated as having been completed.

Subsequently, since there are no other groups that are being formed, remaining pairs 9-10-11-12 are denoted as group 3, which is one group.

In this manner, evaluation device 1 can group the unit data in the unit data collection into two or more groups by using the correlation coefficients of the data items of the unit data collection.

Note that in the present example, the number of data items and the number of groups are determined in advance, but even in the case where only the number of pieces of data is determined or only the number of groups is determined, grouping is possible in corresponding steps.

Possibility of Other Embodiments

The above embodiment describes the evaluation device, the evaluation method, and the non-transitory computer-readable recording medium having a program recorded thereon according to the present disclosure, but subjects, devices, etc., to which the processes are applied are not particularly limited. The processing may be performed by a processor and the like (to be described below) embedded in a specific locally installed device. The processing may be performed by a cloud server and the like installed in a location different from the location of the local device.

Note that the present disclosure is not limited to the above-described embodiment. For example, other embodiments that can be realized by arbitrarily combining structural elements described in the present specification or by removing some structural elements may be embodiments of the present disclosure. Furthermore, variations obtainable through various changes to the above-described embodiment that can be conceived by a person having ordinary skill in the art without departing from the essence of the present disclosure, that is, the meaning of the recitations in the claims are included in the present disclosure.

Furthermore, the present disclosure includes the following cases.

(1) The above-described device is specifically a computer system configured from a microprocessor, a read only memory (ROM), a random access memory (RAM), a hard disk unit, a display unit, a keyboard, and a mouse, for example. A computer program is stored in the RAM or the hard disk unit. Each device achieves its function as a result of the microprocessor operating according to the computer program. Here, the computer program is configured of a combination of command codes indicating commands to the computer in order to achieve a predetermined function.

(2) Some or all of the structural elements included in the above-described device may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

(3) A portion of the structural elements included in the above-described device may each be configured from an IC card or a standalone module that can be inserted into and removed from the corresponding device. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamperproof.

(4) Moreover, the present disclosure may be the method described above. The method may be a computer program implemented by a computer, or may be a digital signal of the computer program.

(5) Moreover, the present disclosure may be the aforementioned computer program or digital signal recorded on recording media readable by a computer, such as a flexible disk, a hard disk, a compact disc read-only memory (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, the present disclosure may be the aforementioned computer program or digital signal transmitted via a telecommunication line, a wireless or wired communication line, a network represented by the Internet, data broadcasting, or the like.

Furthermore, the present disclosure may be a computer system including a microprocessor and a memory. The memory may store the aforementioned computer program, and the microprocessor may operate according to the computer program.

Moreover, by transferring the recording medium having the aforementioned program or digital signal recorded thereon or by transferring the aforementioned program or digital signal via the aforementioned network or the like, the present disclosure may be implemented by a different independent computer system.

INDUSTRIAL APPLICABILITY

The present disclosure can be used in an evaluation device, an evaluation method, and a program in which the Mahalanobis distance is used, and can be used particularly in an evaluation device, an evaluation method, and a non-transitory computer-readable recording medium having a program recorded thereon that are used to determine an abnormality of a production facility or the like.

The invention claimed is:

1. An evaluation device for evaluating a signal data collection from a data set using a Mahalanobis distance, the data set including a unit data collection and the signal data collection, the unit data collection being a collection of data to be used as a reference for a plurality of data items, the signal data collection being one or more pieces of data to be evaluated for the plurality of data items, the evaluation device comprising:
   a processor; and
   a memory, wherein
   the processor performs the following using the memory:
      grouping unit data in the unit data collection into two or more groups each including at least one of the plurality of data items;
      calculating a unit space in each of two or more per-group unit data collections as a per-group unit space, the two or more per-group unit data collections being unit data collections obtained by grouping the unit data into the two or more groups;
      calculating, using the per-group unit space calculated, a first Mahalanobis distance of a corresponding one of the two or more per-group unit data collections;
      calculating, using each per-group unit space calculated, a second Mahalanobis distance of the signal data collection in a corresponding one of the plurality of data items;
      calculating a first linear combination of a plurality of the first Mahalanobis distances calculated;
      calculating a second linear combination of a plurality of the second Mahalanobis distances calculated; and
      comparing the first linear combination calculated and the second linear combination calculated, and outputting a result of the comparing as a first comparison result.

2. The evaluation device according to claim 1, wherein the grouping of the unit data in the unit data collection into the two or more groups includes:
   obtaining a correlation coefficient indicating a relationship between every pair of data items among the plurality of data items of the unit data collection;
   sorting, in descending order, a plurality of the correlation coefficients obtained;
   determining an upper limit of a total number of data items included in each of the two or more groups; and
   classifying each pair of data items indicating the correlation coefficients in the descending order, as one of the two or more groups according to the upper limit of the total number determined, to group the unit data in the unit data collection into the two or more groups.

3. The evaluation device according to claim 2, wherein the classifying includes, when at least one of the pair of data items indicating the correlation coefficient overlaps a data item included in a previous classification group and a total number of data items included in the previous classification group is smaller than the upper limit of the total number determined, classifying the pair of data items indicating the correlation coefficient as the previous classification group.

4. The evaluation device according to claim 1, wherein the grouping of the unit data in the unit data collection into the two or more groups includes:
   for every pair of data items among the plurality of data items, obtaining a correlation coefficient indicating a relationship between a selected pair of data items among the plurality of data items, and when the correlation coefficient obtained is greater than or equal to a threshold value, classifying the selected pair of data items as one of the two or more groups; and when the obtaining of the correlation coefficient and the classifying of the selected pair of data items are performed for every pair, classifying one or more data items that have not been classified as one of the two or more groups, as one of the two or more groups that has not been used during the repetitive classification for every pair, to group the unit data in the unit data collection into the two or more groups.

5. The evaluation device according to claim 1, wherein the grouping of the unit data in the unit data collection into the two or more groups includes:
    determining a total number of groups in the two or more groups; and
    allocating the plurality of data items of the unit data collection to the groups whose total number has been determined, to group the unit data in the unit data collection into the two or more groups.

6. The evaluation device according to claim 1, wherein the grouping of the unit data in the unit data collection into the two or more groups includes:
    determining a total number of data items included in each of the two or more groups; and
    grouping the plurality of data items of the unit data collection for each of the data items whose total number has been determined, to group the unit data in the unit data collection into the two or more groups.

7. The evaluation device according to claim 1, wherein each coefficient in linear form to be used to calculate the first linear combination and the second linear combination is a unit fraction where a denominator is a total number of groups in the two or more groups.

8. The evaluation device according to claim 1, wherein the processor further performs the following using the memory:
    comparing, for each signal data collection, the plurality of the second Mahalanobis distances calculated, and outputting a result of the comparing as a second comparison result; and
    performing an item diagnosis for analyzing, based on the second comparison result, which of the plurality of data items has become abnormal.

9. An evaluation method for a computer to evaluate a signal data collection from a data set using a Mahalanobis distance, the data set including a unit data collection and the signal data collection, the unit data collection being a collection of data to be used as a reference for a plurality of data items, the signal data collection being one or more pieces of data to be evaluated for the plurality of data items, the evaluation method comprising:
    grouping unit data in the unit data collection into two or more groups each including at least one of the plurality of data items;
    calculating a unit space in each of two or more per-group unit data collections as a per-group unit space, the two or more per-group unit data collections being unit data collections obtained by grouping the unit data into the two or more groups;
    calculating, using the per-group unit space calculated, a first Mahalanobis distance of a corresponding one of the two or more per-group unit data collections;
    calculating, using each per-group unit space calculated, a second Mahalanobis distance of the signal data collection in a corresponding one of the plurality of data items;
    calculating a first linear combination of a plurality of the first Mahalanobis distances calculated;
    calculating a second linear combination of a plurality of the second Mahalanobis distances calculated; and
    comparing the first linear combination calculated and the second linear combination calculated, and outputting a comparison result.

10. A non-transitory computer-readable recording medium having recorded thereon a program for causing a computer to perform an evaluation method for evaluating a signal data collection from a data set using a Mahalanobis distance, the data set including a unit data collection and the signal data collection, the unit data collection being a collection of data to be used as a reference for a plurality of data items, the signal data collection being one or more pieces of data to be evaluated for the plurality of data items, the evaluation method comprising:
    grouping unit data in the unit data collection into two or more groups each including at least one of the plurality of data items;
    calculating a unit space in each of two or more per-group unit data collections as a per-group unit space, the two or more per-group unit data collections being unit data collections obtained by grouping the unit data into the two or more groups;
    calculating, using the per-group unit space calculated, a first Mahalanobis distance of a corresponding one of the two or more per-group unit data collections;
    calculating, using each per-group unit space calculated, a second Mahalanobis distance of the signal data collection in a corresponding one of the plurality of data items;
    calculating a first linear combination of a plurality of the first Mahalanobis distances calculated;
    calculating a second linear combination of a plurality of the second Mahalanobis distances calculated; and
    comparing the first linear combination calculated and the second linear combination calculated, and outputting a comparison result.

* * * * *